United States Patent
Zihir et al.

(10) Patent No.: US 10,750,377 B1
(45) Date of Patent: *Aug. 18, 2020

(54) MULTI-MODE CONTROL WITH FAST-ACCESS LOOKUP TABLE IMPLEMENTATION

(71) Applicant: Integrated Device Technology, Inc., San Jose, CA (US)

(72) Inventors: Samet Zihir, San Diego, CA (US); Kevin Sheng, San Jose, CA (US); Mark Cuezon, San Diego, CA (US); Himanshu Khatri, San Diego, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,711

(22) Filed: Mar. 28, 2019

(51) Int. Cl.
*H04L 12/28* (2006.01)
*H04W 16/28* (2009.01)
(Continued)

(52) U.S. Cl.
CPC .......... *H04W 16/28* (2013.01); *H01Q 3/2658* (2013.01); *H04B 7/18513* (2013.01); *H04W 72/046* (2013.01)

(58) Field of Classification Search
CPC ........ H04B 1/401; H04B 1/0458; H04B 1/18; H04B 7/0617; H04B 7/18513; H03F 3/195; H03F 3/45089; H03H 7/487; H03K 21/10; H01Q 1/2283; H01Q 1/48; H01Q 1/526; H01Q 3/28; H01Q 3/36; H01Q 19/30; H01Q 21/0006; H01Q 21/0025; H01Q 21/062; H01Q 21/065; H04W 16/28; H04W 72/046; H04Q 3/2658

See application file for complete search history.

(56) References Cited

U.S. PATENT DOCUMENTS

| | | | |
|---|---|---|---|
| 5,339,086 A * | 8/1994 | DeLuca | H01Q 3/22 342/371 |
| 6,784,838 B2 * | 8/2004 | Howell | H01Q 3/26 342/377 |

(Continued)

OTHER PUBLICATIONS

Rebeiz et al, A 60 GHz 64-element Phased-Array Beam-Pointing Communication System for 5G 100 Meter Links up to 2 Gbps, IEEE, 3 pages, 2016.*

(Continued)

*Primary Examiner* — Frank Duong
(74) *Attorney, Agent, or Firm* — Christopher P. Maiorana, PC

(57) ABSTRACT

An apparatus comprises a plurality of transceiver circuits, a memory, and an interface circuit. The memory generally embodies a table associating a plurality of index values with corresponding gain and phase values for each channel of each of the transceiver circuits. In a first mode, the interface circuit may be configured to receive the corresponding gain and phase values associated with each of the plurality of index values and store the corresponding gain and phase values in the table. In a second mode, the interface circuit, in response to receiving one of the index values, configures each channel of each of the transceiver circuits with the corresponding gain and phase values from the table.

20 Claims, 21 Drawing Sheets

(51) Int. Cl.
*H04B 7/185* (2006.01)
*H01Q 3/26* (2006.01)
*H04W 72/04* (2009.01)

(56) References Cited

U.S. PATENT DOCUMENTS 10,063,303 B1 * 8/2018 Zihir .................. H01Q 1/2283
10,483,653 B2 * 11/2019 Zihir ....................... H04B 1/44
10,594,376 B2 * 3/2020 Da Silva ............ H04W 72/046

OTHER PUBLICATIONS

Bonjour et al, Ultra-Fast Millimeter Wave Beam Steering, IEEE, 8 pages, Jan. 2016.*
Sadhu et al, A 28-GHz 32-Element TRX Phased-Array IC With Concurrent Dual-Polarized Operation and Orthogonal Phase and Gain Control for 5G Communications, IEEE, 19 pages, Dec. 2017.*
Aljuhani et al, A Scalable Dual-Polarized 256-Element Ku-Band SATCOM Phased-Array Transmitter with 36.5 dBW EIRP Per Polarization, EuMA, 4 pages, Sep. 2018.*

* cited by examiner

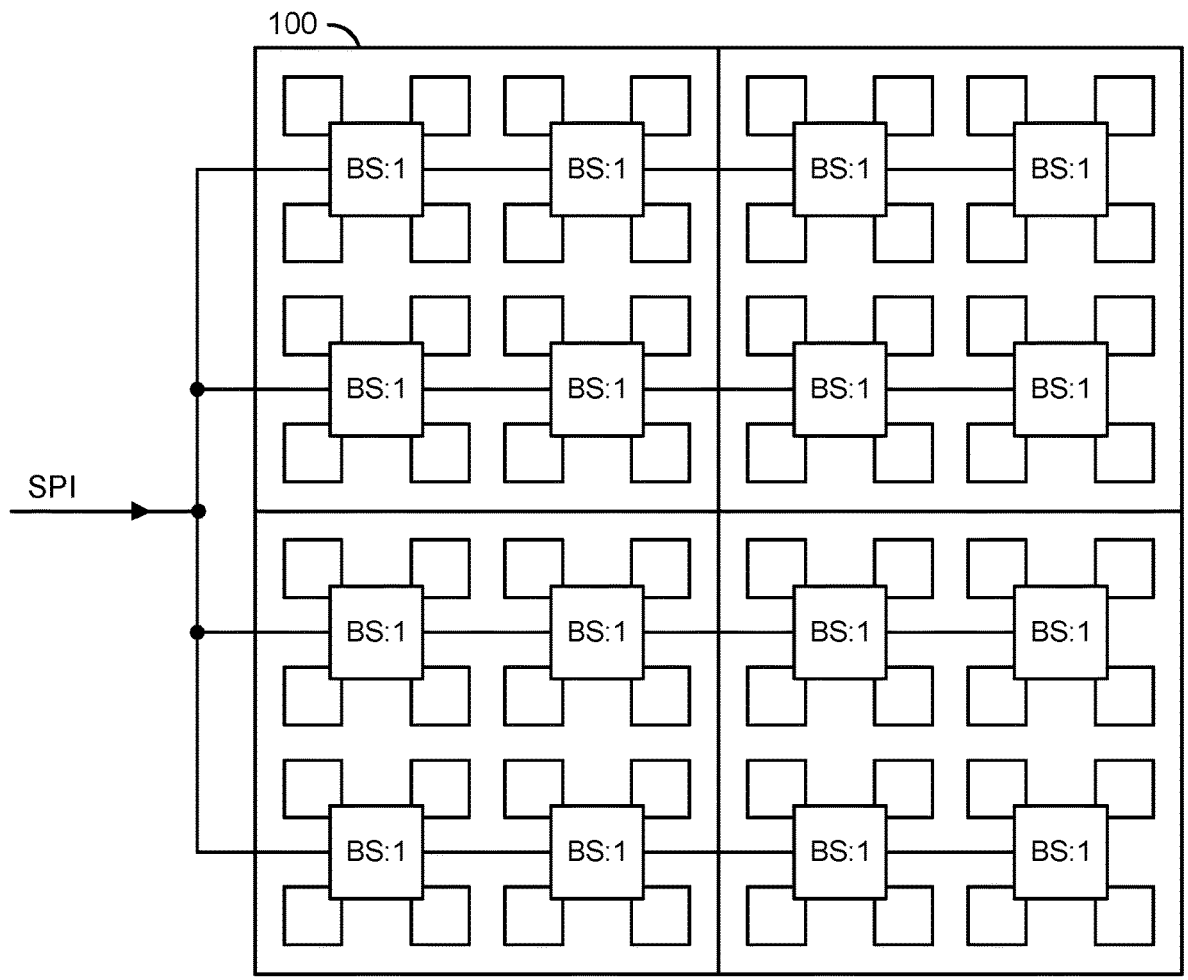
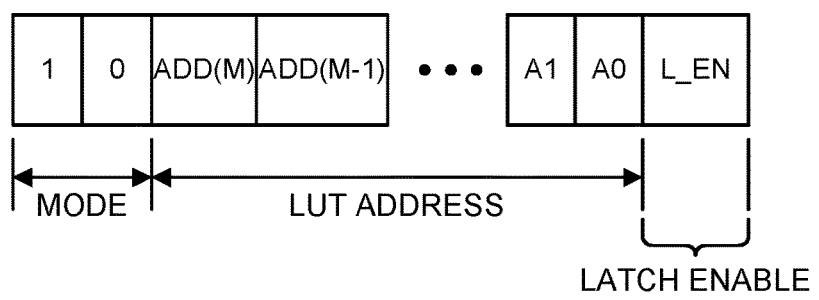
FIG. 14

MULTI-MODE CONTROL WITH FAST-ACCESS LOOKUP TABLE IMPLEMENTATION

FIELD OF THE INVENTION

The invention relates to radio frequency beam control generally and, more particularly, to a method and/or apparatus for implementing multi-mode control with a fast-access lookup table implementation.

BACKGROUND

Phased array antenna panels are used to generate steerable beams that may be utilized in wireless communication systems. Phased arrays create a focused beam that can be steered very quickly to maintain a link for any on-the-move communication system. Conventional wireless communications systems can also utilize steerable beams to communicate with multiple wireless nodes by moving the beams from one wireless node to the next. A single beam may service multiple wireless nodes in a sequence and repeat the sequence periodically such that each wireless node appears to be in constant communications with the system. The beam steering is generally implemented by amplifiers and phase shifters in each transmit channel of the transceiver circuitry. The power amplifiers drive respective antenna elements of the phased array antenna to produce and steer the beams.

The antenna elements of the phased array antenna also need to be connected to each receive channel of the transceiver circuitry to provide bi-directional communication. The transceiver circuitry needs to switch the antenna elements between the transmit channels and the receive channels quickly, such that each wireless node appears to be in constant communications with the system. Transmit/receive (T/R) switches are generally used to couple the transmit and receive channels to the antenna elements. The switching speed and settling time parameters of the channels are very important for low-latency specifications, such as in emerging fifth generation (5G) communications systems.

It would be desirable to implement multi-mode control with a fast-access lookup table implementation.

SUMMARY

The invention concerns an apparatus comprising a plurality of transceiver circuits, a memory, and an interface circuit. The memory generally embodies a table associating a plurality of index values with corresponding gain and phase values for each channel of each of the transceiver circuits. In a first mode, the interface circuit may be configured to receive the corresponding gain and phase values associated with each of the plurality of index values and store the corresponding gain and phase values in the table. In a second mode, the interface circuit, in response to receiving one of the index values, configures each channel of each of the transceiver circuits with the corresponding gain and phase values from the table.

BRIEF DESCRIPTION OF THE FIGURES

Embodiments of the invention will be apparent from the following detailed description and the appended claims and drawings in which:

FIG. 14 is a diagram illustrating another fast beam steering mode in accordance with an example embodiment of the invention.

DETAILED DESCRIPTION OF THE EMBODIMENTS

Embodiments of the present invention include providing multi-mode control with a fast-access lookup table implementation that may (i) utilize a serial peripheral interface protocol (e.g., SPI, I²C, etc.), (ii) store a plurality of beam space parameters in a memory of each of a plurality of beamformer chips of a phased array antenna panel, (iii) configured a memory as a lookup table associating gain and phase parameters for each beam of the beam space to a respective index, (iv) implement a static write mode, (v) implement a static read mode, (vi) implement a global fast beam steering mode, (vii) implement one or more local fast beam steering modes, (viii) be utilized in E, Ku, Ka, 5G mmW, and/or CDL frequency band applications, (ix) be applied in both single-beam and dual-beams applications, and/or (x) be implemented as one or more integrated circuits.

Figure 1:
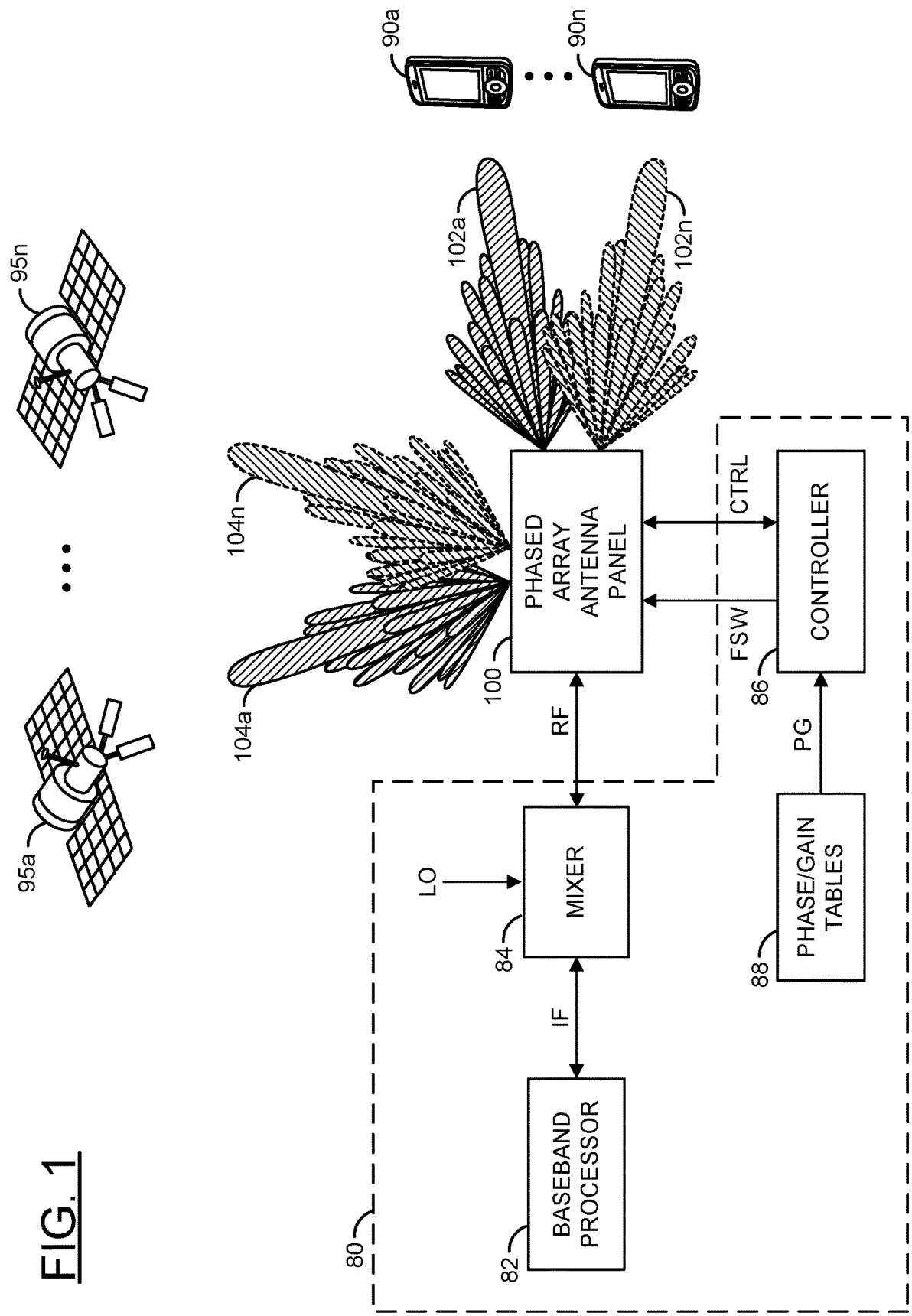
FIG. 1 is a diagram of a system illustrating an example context of the invention.

Referring to FIG. 1, a block diagram of a system 80 is shown illustrating an example context of the invention. The system (or module or circuit or apparatus) 80 may implement a radio-frequency (RF) transceiver system in accordance with an example embodiment of the invention. The RF transceiver system 80 may be configured to operate at common wireless radio frequencies, microwave frequencies, and/or millimeter-wave frequencies. In an example, the RF transceiver system 80 may be configured to facilitate communication with and/or between a plurality of communications devices (or terminals) 90a-90n and/or a plurality of satellites 95a-95n. In an example, the communications devices 90a-90n may include, but are not limited to, cellular telephones, mobile devices, tablets, internet-of-things (IoT) equipment, base stations, etc. In an example, the satellites 95a-95n may include, but are not limited to, low earth orbit (LEO) satellites, geo-stationary earth orbiting (GEO) satellites, etc. In various embodiments, the RF transceiver system 80, the communications devices 90a-90n, and/or the satellites 95a-95n may be coupled using at least one phased array antenna panel 100 in accordance with an example embodiment of the invention.

In an example, the RF transceiver system 80 may form part of a communications link. In some embodiments, the communications link may be part of a fifth generation (5G) wireless communications system (e.g., for which a standard is currently under development by the Next Generation Mobile Networks (NGMN) Alliance). In some embodiments, the communications link may be part of a 5G milli-meter wave (mmW) wireless communications system. In an example, an embodiment of the invention may be part of 28 GHz and/or 39 GHz 5G mmW applications. In other embodiments, the communications link may be part of systems including, but not limited to, a fourth generation (4G) wireless communications system (e.g., International Mobile Telecommunications-Advanced (IMT-A) standard published by the International Telecommunications Unit Radiocommunication Sector (ITU-R)), a satellite communication (SATCOM) system, and point-to-point communications systems such as common data link (CDL), E-band, backhaul, etc. However, other communications standards may be implemented to meet the design criteria of a particular application.

In an example, the RF transceiver system 80 may comprise a block (or circuit) 82, a block (or circuit) 84, a block (or circuit) 86, and a block (or circuit) 88. In various embodiments, the blocks 82-88 may be implemented with hardware, a combination of hardware and software, and/or simulated with software. A signal (e.g., IF) may be exchanged between the circuit 82 and the circuit 84. The signal IF may implement an intermediate-frequency signal. In an example, the signal IF may be configured (e.g., using various modulation schemes) to carry information to be transmitted from and/or received by the RF transceiver system 80. In an example, a signal (e.g., LO) may be presented to the circuit 84. The signal LO may implement a local oscillator signal. A signal (e.g., RF) may be exchanged between the circuit 84 and the phased array antenna panel 100. The signal RF may be a radio-frequency, millimeter-wave frequency, or microwave frequency signal that conveys the information also found in the intermediate-frequency signal IF. The signal RF may comprise one or more beams.

In a transmit mode, the radio-frequency signal RF may convey information to be broadcast from the phased array antenna panel 100 to the devices 90a-90n and/or the satellites 95a-95n. In a receive mode, the radio-frequency signal RF may convey information received from the devices 90a-90n and/or the satellites 95a-95n via the phased array antenna panel 100. A signal (e.g., FSW) and a signal or signals (e.g., CTRL) may be exchanged between the circuit 86 and the phased array antenna panel 100. The signal FSW may switch the phased array antenna panel 100 between the transmit mode and the receive mode. The signal(s) CTRL may convey data, clocking, and control elements. In an example, the signals FSW and CTRL may be part of a digital interface of the phased array antenna panel 100. In an example, the signal(s) CTRL may be implemented as a serial link that conveys information for configuring and/or determining phase and/or gain settings for antenna elements of the phased array antenna panel 100. In an example, the signal(s) CTRL may be compliant with one or more serial communication protocols or interfaces (e.g., serial peripheral interface (SPI), inter-integrated circuit communications (I²C), daisy chain, etc.). A signal or signals (e.g., PG) may be transferred from the circuit 88 to the circuit 86. In an example, the signal(s) PG may convey phase information and gain information used by the circuit 86 to implement (control) beam steering using the phased array antenna panel 100. In an example, the signal(s) PG may convey a plurality of phase and gain values that may be programmed into a plurality of beamformer circuits of the phased array antenna panel 100 via the signal(s) CTRL. In various embodiments, the phase and gain values may be programmed into a memory, register store, and/or lookup table (LUT) of each of the plurality of beamformer circuits of the phased array antenna panel 100.

The phased array antenna panel 100 generally implements a hard-wired address scheme. The hard-wired address scheme may be used to uniquely identify serial communications intended for elements (e.g., the beamformer circuits) of the phased array antenna panel 100. In various embodiments, multiple phased array antenna panels 100 may be combined to form a larger antenna array that may provide more transmission channels. The multiple phased array antenna panels may share a serial communication channel, link, or bus. Each of the phased array antenna panels 100 making up the larger antenna array may be uniquely addressed using respective hard-wired addresses.

The phased array antenna panel 100 may generate one or more fields (or beams) 102a-102n and/or 104a-104n. The fields 102a-102n and/or 104a-104n may represent a field pattern (or radio-frequency beam pattern) generated by the beamformer circuits of the phased array antenna panel 100 based upon the phase and gain information (values) received via the signal(s) CTRL. The phased array antenna panel 100 may be configured to produce directional beams 102a-102n and/or 104a-104n for communication with the communication devices 90a-90n and/or the satellites 95a-95n. In an example, the phased array antenna panel 100 may be controlled to steer the beams 102a-102n and/or 104a-104n, based on the phase and gain information received via the signal (s) CTRL, to track movement of the communication devices 90a-90n and/or the satellites 95a-95n and/or switch between the communication devices 90a-90n and/or the satellites 95a-95n.

The circuit 82 may implement a baseband processor circuit. The circuit 82 may be operational to process the information sent by and/or received in the intermediate-frequency signal IF. The circuit 82 may process the information within the RF transceiver system 80. The processing may include, but is not limited to, modulation/demodulation of the signal that contains the information and management of simultaneous communications between the RF transceiver system 80 and the multiple remote terminals 90a-90n.

The circuit 84 may implement one or more mixer circuits. The circuit 84 is generally operational to frequency convert (e.g., up-convert, down-convert, etc.) between an intermediate frequency used for the signal IF and the radio frequency, millimeter-wave frequency, or microwave frequency used for the signal RF. The frequency conversion may be based on one or more local oscillator frequencies provided by the signal LO. In various embodiments, the radio-frequency signal RF may be in a range of frequencies approximately centered around a center frequency of either 28 gigahertz (GHz) or 39 GHz (e.g., 24 GHz to 30 GHz or 37 GHz to 44 GHz). In embodiments implementing multiple intermediate frequencies, each intermediate frequency may cover a band from approximately 2 GHz to about 6 GHz (e.g., an approximately 4 GHz bandwidth). In an example, each local oscillator frequency may range from approximately 22 GHz to 26 GHz when the signal RF is approximately centered at 28 GHz. In another example, each local oscillator frequency may range from approximately 33 GHz to 37 GHz when the signal RF is approximately centered at 39 GHz. However, other frequency ranges may be implemented to meet the design criteria of a particular application.

The circuit 86 may implement a control circuit. In various embodiments, the circuit 86 may be implemented using one or more of an application specific integrated circuit (ASIC), controller, microprocessor, or circuitry configured accordingly. The circuit 86 is generally operational to control the operations of the phased array antenna panel 100. In some embodiments, the circuit 86 may determine the setting values used in each transceiver channel within the beamformer circuits of the phased array antenna panel 100. The setting values may establish the geometry of the field(s) or beam(s) 102a-102n and/or 104a-104n. In various embodiments, the circuit 86 may be implemented as one or more integrated circuits.

In an example, the circuit 88 may implement a table of values (e.g., embodied in a memory circuit). In an example, the table of values embodied in the circuit 88 may be configured to store multiple gain (G) values and multiple phase (P) values. The phase and gain values may be used by the transceiver channels in the phased array antenna panel 100 to establish the fields 102a-102b. The phase values and the gain values may be fetched from the circuit 88 via the signal PG and programmed into buffers associated with the beamformer circuits of the phased array antenna panel 100 by the circuit 86. In various embodiments, the circuits 86 and 88 may be implemented either on the same integrated circuit or on different (separate) integrated circuits.

In an example, the phased array antenna panel 100 may be implemented comprising either single-polarization (or single-pole) antenna elements or dual-polarization (or dual-pole or di-pole) antenna elements. The phased array antenna panel 100 may be operational to transmit and receive wireless signals to and from the devices (or terminals) 90a-90n and/or the satellites 95a-95n. The devices (or terminals) 90a-90n and/or the satellites 95a-95n may be remotely located from the RF transceiver system 80. Sensitivity to the wireless and/or satellite signals may be determined by the fields 102a-102n and/or 104a-104n created by the phased array antenna panel 100. The phased array antenna panel 100 may comprise a plurality of antenna elements and a plurality of beamformer circuits. Each beamformer circuit may implement a plurality of channels. Each channel may comprise a transmit (TX) channel, a receive (RX) channel, or both transmit and receive (TRX) channels. The channels may be coupled to the antenna elements by corresponding radio-frequency signals. In embodiments implementing both transmit and receive channels, the channels may be coupled to the antenna elements by bidirectional radio-frequency signals. The channels and antenna elements generally form a two-dimensional antenna network. The channels are generally referred to herein as transceiver channels. The term transceiver channel is not intended to be limited to or require both transmit and receive capability, but instead is intended to encompass receive only, transmit only and transmit and receive capable channels.

Figure 2:
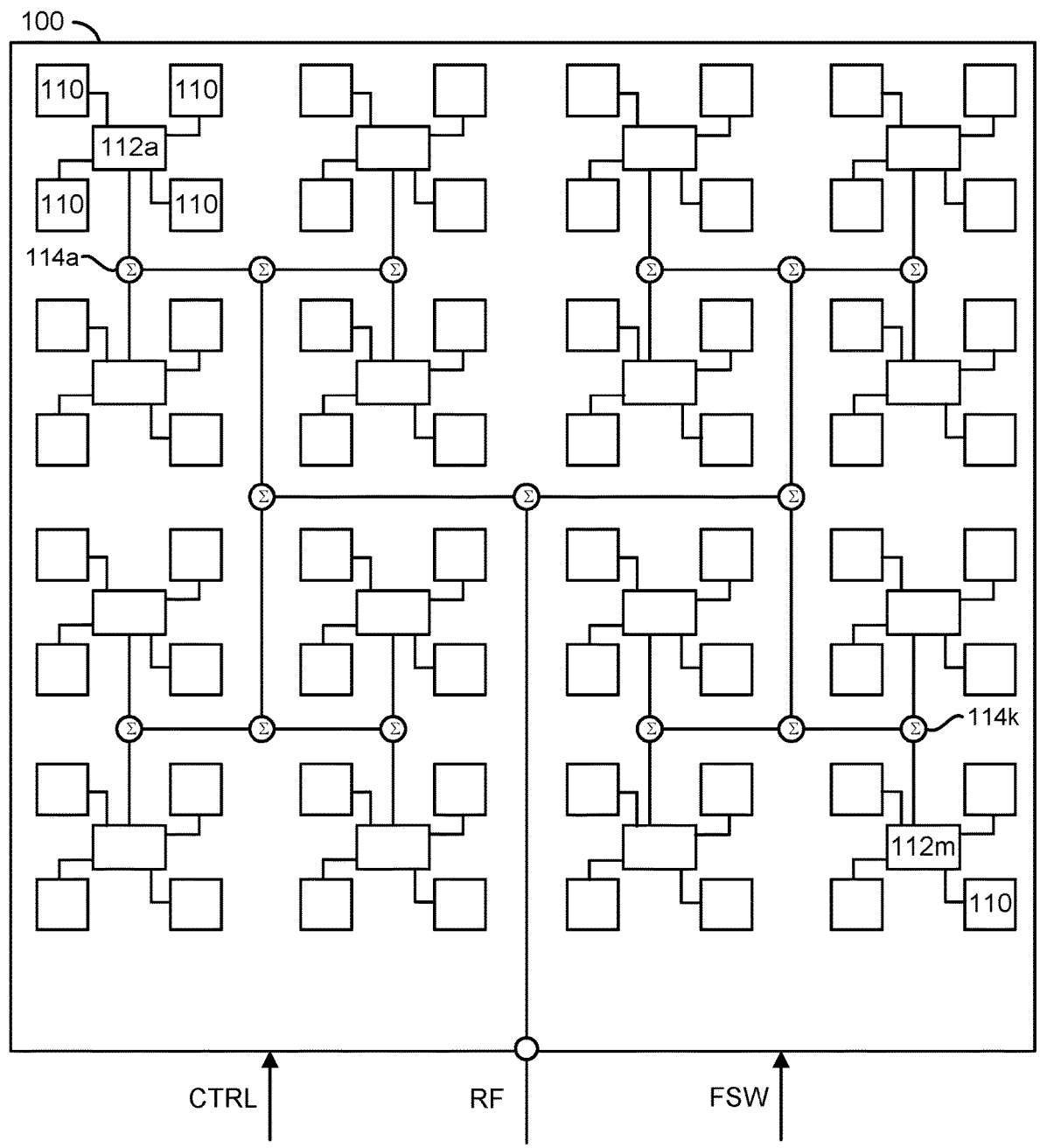
FIG. 2 is a diagram illustrating an example implementation of a single-polarization phased array antenna panel in accordance with an example embodiment of the invention.

Referring to FIG. 2, a diagram is shown illustrating an example implementation of a single-polarization version of the phased array antenna panel 100 in accordance with an embodiment of the invention. In an example, the phased array antenna panel 100 may comprise a number of blocks (or circuits) 110, a number of blocks (or circuits) 112a-112m, and a number of blocks (or circuits) 114a-114k. In embodiments implementing a single-polarization phased array antenna panel, the blocks 110 generally are implemented as single polarization (or single-pole) antenna elements. Each of the circuits 112a-112m may implement a single-polarization beamformer circuit. Each of the circuits 114a-114k may implement a combiner/splitter circuit. The circuits 112a-112m, and 114a-114k may be implemented with hardware, a combination of hardware and software, and/or simulated with software. In an example, the signal RF may be exchanged with one of the circuits 114a-114k. The signals FSW and CTRL may be exchanged with the circuits 112a-112m.

The antenna elements 110 in the phased array antenna panel 100 may be used for both transmission and reception. A physical positioning of the antenna elements 110 generally provides for two-dimensional (e.g., horizontal and vertical) control of the fields 102a-102n and/or 104a-104n. In an example, the antenna elements 110 may be arranged in a 2-dimensional (e.g., N×N) grid pattern, where N is an integer value divisible by two. However, other dimensions of grid patterns may be implemented accordingly to meet design criteria of a particular implementation.

The circuits 112a-112m are generally operational to multiplex/demultiplex the signal RF with a number of the antenna elements 110. In various embodiments, each of the circuits 112a-112m may be mounted on a substrate of the phased array antenna panel 100 adjacent to (e.g., centered among) a number (or group) of the antenna elements 110. In an example, each circuit 112a-112m generally comprises a number of transceiver channels that are coupled to respective antenna elements 110. In an example, each circuit 112a-112m may be coupled to four adjacent antenna elements 110 (e.g., arranged in a 2×2 grid around each circuit 112a-112m). However, other numbers (e.g., 1, 2, 4, 18, etc.) of adjacent antenna elements 110 may be implemented to meet design criteria of a particular implementation.

The circuits 112a-112m may be configured to switch between a transmit mode and a receive mode in response to the signal FSW. In the transmit mode, the circuits 112a-112m may be operational to rapidly change setting values (e.g., phase values, gain values, etc.) used by the transceiver channels in order to steer the beams (or fields) 102a-102n and/or 104a-104n formed by the phased array antenna panel 100. In various embodiments, each of the circuits 112a-112m may comprise a memory, register store, and/or lookup table (LUT) that may be utilized to store a plurality of phase and gain values for each channel of the circuits 112a-112m corresponding to a plurality of beams in a predetermined beam space. In an example, the plurality of phase and gain values for each channel may be associated with an index corresponding to each beam of the beam space. In various embodiments, each of the circuits 112a-112m may be implemented as one or more integrated circuits (e.g., in a package or multi-chip module (MCM)).

In various embodiments, each of the circuits 114a-114k may be implemented as a combiner/splitter circuit. In an example, the circuits 114a-114k may be implemented as Wilkinson combiner/splitters. In various embodiments, the circuits 114a-114k may be coupled together to form a network that couples the circuits 112a-112m to an input/output of the phased array antenna panel 100 configured to present/receive the signal RF. In the transmit mode, the circuits 114a-114k are generally operational to distribute the power in the signal RF among the circuits 112a-112m. In the receive mode, the circuits 114a-114k may be operational to combine the power received in signals from the circuits 112a-112m into the signal RF. The circuits 112a-112n and 114a-114k are generally configured to provide a substantially equivalent path length between the RF input/output of the phased array antenna panel 100 and each of the circuits 112a-112m.

Figure 3:
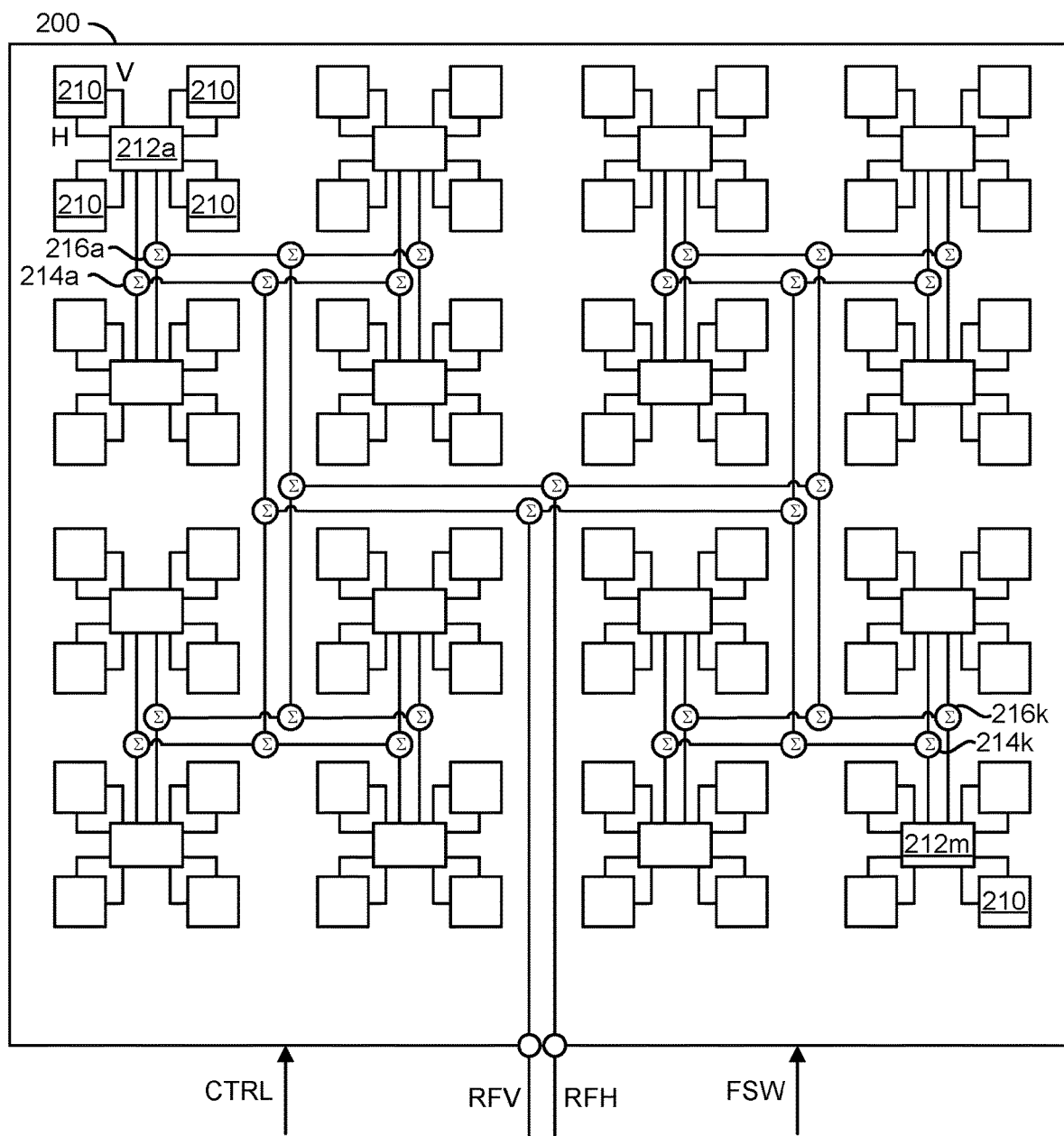
FIG. 3 is a diagram illustrating an example implementation of a dual-polarization phased array antenna panel in accordance with an example embodiment of the invention.

Referring to FIG. 3, a diagram is shown illustrating an example implementation of a dual-polarization phased array antenna panel 200 in accordance with another example embodiment of the invention. In embodiments implementing dual-polarization transceiver channels, the phased array antenna panel 200 may be used in place of the phased array antenna panel 100 of FIG. 1. In an example, the phased array antenna panel 200 may comprise a number of blocks (or circuits) 210, a number of blocks (or circuits) 212a-212m, a number of blocks (or circuits) 214a-214k, and a number of blocks (or circuits) 216a-216k. In embodiments implementing a dual-polarization phased array antenna panel, the blocks 210 generally are implemented as dual-polarization (or dual-pole or di-pole) antenna elements. Each of the circuits 212a-212m may implement a dual-polarization beamformer circuit. Each of the circuits 214a-214k and 216a-216k may implement a combiner/splitter circuit. The circuits 212a-212m, 214a-214k, and 216a-216k may be implemented with hardware, a combination of hardware and software, and/or simulated with software. In embodiments implementing the dual-polarization phased array antenna panel 200, the signal RF may comprise a vertical polarized component (e.g., RFV) and a horizontal polarized component (e.g., RFH). In an example, the signal RFV may be exchanged with one of the circuits 214a-214k and the signal RFH may be exchanged with one of the circuits 216a-216k. The signals FSW and CTRL may be exchanged with the circuits 212a-212m.

The antenna elements 210 in the phased array antenna panel 200 may be used for both transmission and reception. A physical positioning of the antenna elements 210 generally provides for two-dimensional (e.g., horizontal and vertical) control of the fields 102a-102n and/or 104a-104n. In an example, the antenna elements 210 may be arranged in a 2-dimensional (e.g., N×N) grid pattern, where N is an integer value divisible by 2. However, other dimensions of grid patterns may be implemented accordingly to meet design criteria of a particular implementation.

The circuits 212a-212m are generally operational to multiplex/demultiplex the signals RFV and RFH with a number of the antenna elements 210. In various embodiments, each of the circuits 212a-212m may be mounted on a substrate of the phased array antenna panel 200 adjacent to a number of the antenna elements 210. Each of the circuits 212a-212m may have respective horizontal (H) and vertical (V) input/outputs that may be coupled to corresponding horizontal (H) and vertical (V) input/outputs (or feeds) of the adjacent antenna elements 210. In an example, each circuit 212a-212m generally comprises a number of transceiver channels that are coupled to respective horizontal and vertical input/outputs. In an example, each circuit 212a-212m may be coupled to four adjacent antenna elements 210 (e.g., arranged in a 2×2 grid around each circuit 212a-212m).

The circuits 212a-212m may be configured to switch between a transmit mode and a receive mode in response to the signal FSW. In the transmit mode, the circuits 212a-212m may be operational to rapidly change setting values (e.g., phase values, gain values, etc.) used by the transceiver channels in order to steer the fields 102a-102n and/or 104a-104n formed by the phased array antenna panel 200. In various embodiments, each of the circuits 212a-212m may comprise a memory, register store, and/or lookup table (LUT) that may be utilized to store a plurality of phase and gain values for each channel of the circuits 212a-212m corresponding to a plurality of beams in a predetermined beam space. In an example, the plurality of phase and gain values for each channel may be associated with an index corresponding to each beam of the beam space. In various embodiments, each of the circuits 212a-212m may be implemented as one or more integrated circuits (e.g., in a package or multi-chip module (MCM)). In an example, each of the circuits 212a-212m may be mounted on a substrate of the phased array antenna panel 200 adjacent to (e.g., centered among) the respective antenna elements 210.

In various embodiments, each of the circuits 214a-214k and 216a-216k may implement a combiner/splitter circuit. In an example, each of the circuits 214a-214k and 216a-216k may be implemented as a Wilkinson combiner/splitter circuit. The circuits 214a-214k may be coupled together to form a network that couples the circuit 212a-212m to an input/output of the phased array antenna panel 200 configured to present/receive the signal RFV. The circuits 216a-216k may be coupled together to form a network that couples the circuit 212a-212m to an input/output of the phased array antenna panel 200 configured to present/receive the signal RFH. In the transmit mode, the circuits 214a-214k and 216a-216k are generally operational to distribute the power in the signals RFV and RFH, respectively, among the circuits 212a-212m. In the receive mode, the circuits 214a-214k and 216a-216k may be operational to combine the power received in signals from the circuits 212a-212m, respectively, into the signals RFV and RFH. The circuits 212a-212n, 214a-214k, and 216a-216k are generally configured to provide a substantially equivalent path length between the RFV input/output and the RFH input/output of the phased array antenna panel 200 and each of the circuits 212a-212m.

Figure 4:
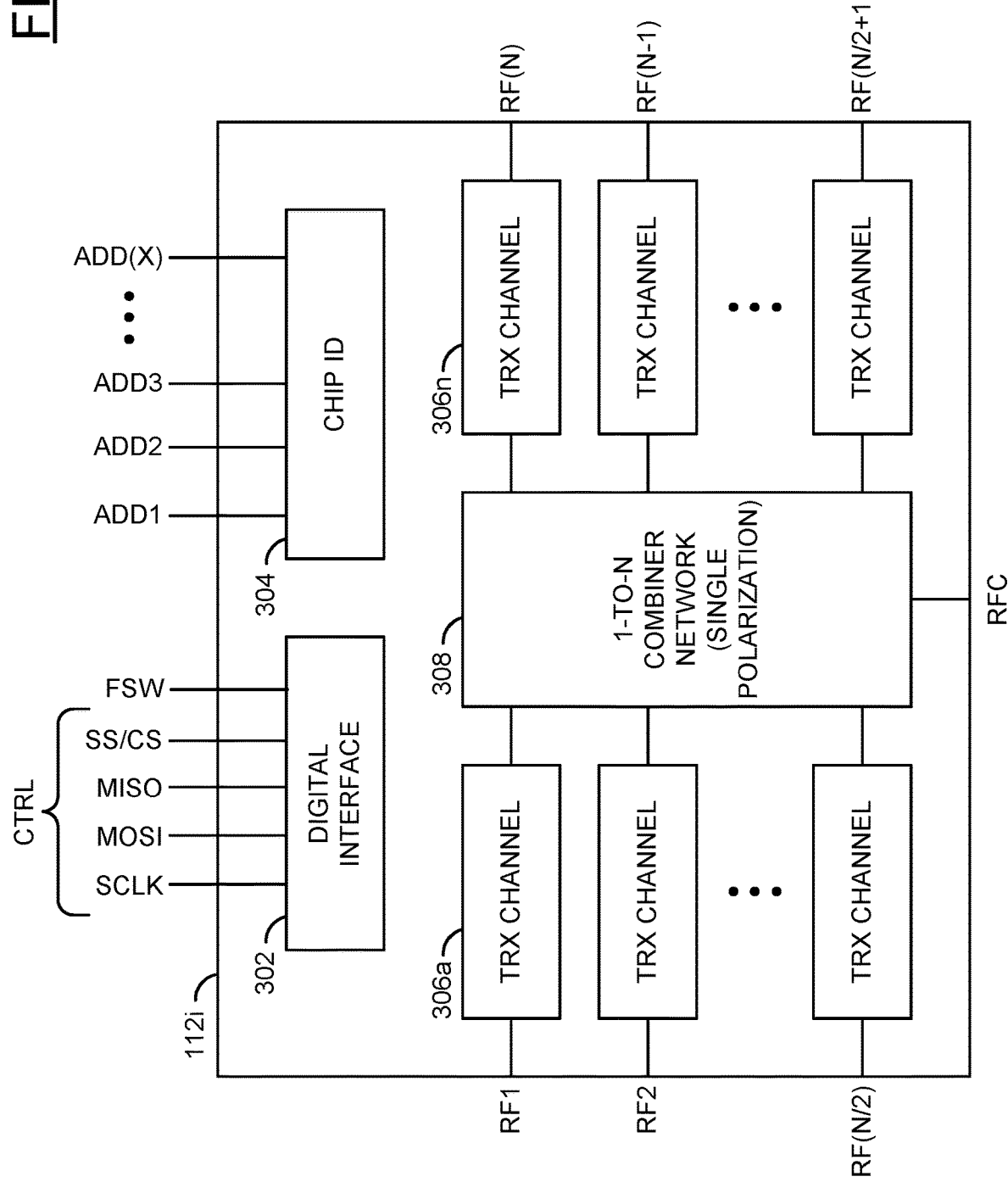
FIG. 4 is a diagram of a single-polarization beamformer circuit in accordance with an example embodiment of the invention.

Referring to FIG. 4, a diagram is shown illustrating an example implementation of a single-polarization beamformer circuit 112*i* in accordance with an example embodiment of the invention. In an example, the single-polarization beamformer circuit 112*i* may be representative of the single-polarization beamformer circuits 112*a*-112*m* of FIG. 2. In an example, the single-polarization beamformer circuit 112*i* may have a digital interface configured to receive the signal FSW and the signal(s) CTRL, a common RF input/output port (RFC), and a number of antenna input/output ports (RF1-RFN). In general, any number (e.g., N) of antenna input/output ports (or channels) may be implemented accordingly to meet design criteria of a particular implementation.

In various embodiments, the signal RF may be presented/received by the common RF input/output RFC, and the antenna input/output ports RF1-RFN may be coupled to respective antenna elements 110. The single-polarization beamformer circuit 112*i* generally implements a number of transceiver channels corresponding to the number of antenna input/output ports RF1-RFN. In various embodiments, each of the transceiver channels may comprise a respective transmit channel and a respective receive channel. The transceiver channels are generally configured to switch between transmitting or receiving based upon the signal FSW.

The single-polarization beamformer circuit 112*i* generally implements a transmit mode and a receive mode. In an example, a state of the signal FSW may determine whether the transmit mode or the receive mode is active. In the transmit mode, the single-polarization beamformer circuit 112*i* is generally configured to receive the radio frequency signal RF at the common input/output port RFC and present radio frequency signals at the antenna input/output ports RF1-RFN. The signals presented at each of the antenna input/output ports RF1-RFN are generated by the single-polarization beamformer circuit 112*i* in response to the radio frequency signal RF received at the common input/output port RFC and a respective number of setting values (e.g., gain, phase, etc.) for each transceiver channel corresponding to each of the antenna input/output ports RF1-RFN. In the receive mode, the single-polarization beamformer circuit 112*i* is generally configured to combine radio frequency signals received at the antenna input/output ports RF1-RFN for presentation as the signal RF at the common input/output port RFC.

The single-polarization beamformer circuit 112*i* may comprise a block (or circuit) 302, a block (or circuit) 304, a number of blocks (or circuits) 306*a*-306*n*, and a block (or circuit) 308. The circuit 302 may implement an interface circuit. In various embodiments, the circuit 302 may implement a digital interface. The circuit 304 may implement a hard-wired address (e.g., chip ID) for the beamformer circuit 112*i*. The circuits 306*a*-306*n* may implement transceiver (TRX) channels. The circuit 308 may implement a 1-to-N combiner/splitter network.

In an example, the signals FSW and CTRL are exchanged with the circuit 302. In an example, the circuit 302 may comprise a serial interface. The circuit 302 may be configured to be compliant with one or more serial interface standards including, but not limited to, serial peripheral interface (SPI), inter-integrated circuit (I²C), daisy chain, etc. In an example, the circuit 302 may be configured to allow programming and control of the single-polarization beamformer circuit 112*i* using a serial communication link (or bus). In an example, the circuit 302 may be configured to program and control the circuits 306*a*-306*n* in response to the signals CTRL and FSW. In an example, the circuit 302 may control whether the circuits 306*a*-306*n* operate in a transmit mode or a receive mode in response to the signal FSW.

In an example, the circuit 302 may implement a 4-wire embedded SPI core. In an example, the circuit 302 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 302 may include a transmit/receive function switching pin that may receive the signal FSW. In an example, the signals MOSI, MISO, SCLK, and SS/CS may be configured to implement a 4-wire SPI protocol interface as summarized in the following TABLE 1:

TABLE 1

| SIGNAL | FUNCTION |
|--------|----------|
| MOSI | Master out Slave in |
| MISO | Master in Slave out |
| SCLK | Serial clock |
| SS/CS | Slave Select/Chip Select |

In an example, the circuit 304 may set a physical address of the beamformer circuit 112*i* based upon hardware coded address bits (or pins). In various embodiments, a hard-wired address may be implemented having a number (e.g., X) of input bits (e.g., ADD1, ADD2, . . . , ADD(X)). In an example, the address may be implemented having six bits (or pins). In some embodiments, the hard-wired address may be set to predetermined logic levels (e.g., 0 or 1) by tying a number of address pins to predetermined supply voltages (e.g., GND, VSS, or VDD). In some embodiments, the hard-wired address bits may be hard coded within the chip implementing the beamformer 112*i*. In some embodiments, the hard-wired address bits may be programmable within the chip implementing the beamformer 112*i* during manufacturing. In an example, the hard-wired address bits may be programmed using fuses, anti-fuses, or other conventional techniques.

Figure 5:
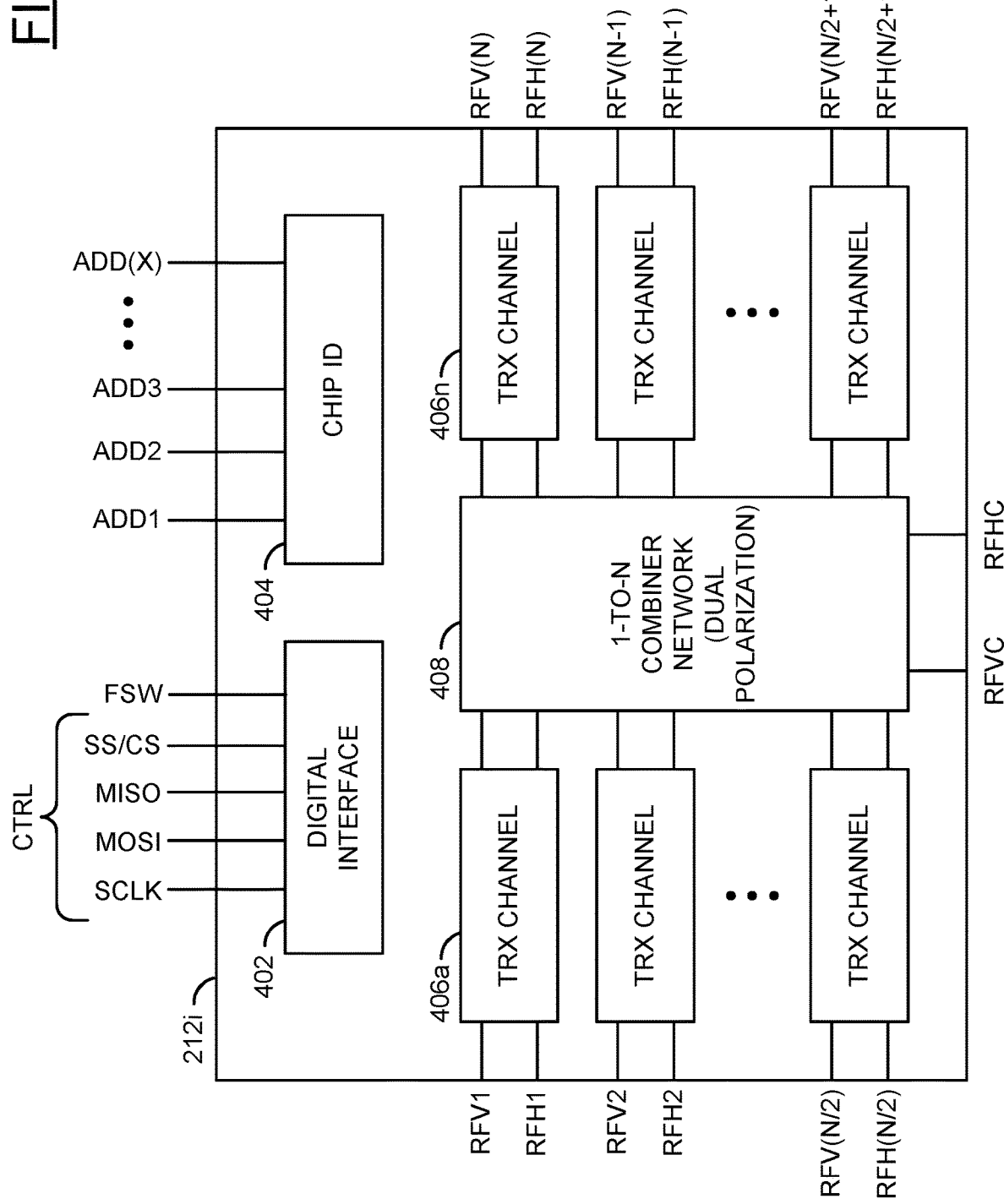
FIG. 5 is a diagram of a dual-polarization beamformer circuit in accordance with an example embodiment of the invention.

Referring to FIG. 5, a diagram is shown illustrating an example implementation of a dual-polarization beamformer circuit 212*i* in accordance with an example embodiment of the invention. In an example, the dual-polarization beamformer circuit 212*i* may be representative of the dual-polarization beamformer circuits 212*a*-212*m* of FIG. 3. In an example, the dual-polarization beamformer circuit 212*i* may have a digital interface configured to receive the signal FSW and the signal(s) CTRL, a first common RF input/output port (RFVC), a second common RF input/output port (RFHC), a number of vertical antenna input/output ports (RFV1-RFV (N)), and a number of horizontal antenna input/output port (RFH1-RFH(N)). In general, any number (e.g., N) of vertical and horizontal antenna input/output ports (or channels) may be implemented accordingly to meet design criteria of a particular implementation.

In various embodiments, the signal RFV may be presented/received by the common RF input/output RFVC, the signal RFH may be presented/received by the common RF input/output RFHC, the vertical antenna input/output ports RFV1-RFV(N) may be coupled to corresponding vertical input/outputs of the respective antenna elements 210, and the horizontal antenna input/output ports RFH1-RFH(N) may be coupled to corresponding horizontal input/outputs of the respective antenna elements 210. The dual-polarization beamformer circuit 212*i* generally implements a number (e.g., N) of transceiver channels corresponding to the number of pairs of vertical and horizontal antenna input/output ports (RFV1, RFH1), (RFV2, RFH2), (RFV(N), RFH(N)). In various embodiments, each of the transceiver channels may comprise a respective transmit channel and a respective receive channel. The transceiver channels are generally configured to switch between transmitting or receiving based upon the signal FSW.

The dual-polarization beamformer circuit 212*i* generally implements a transmit mode and a receive mode. In an example, a state of the signal FSW may determine whether the transmit mode or the receive mode is active. In the transmit mode, the dual-polarization beamformer circuit 212*i* is generally configured to receive radio frequency signals at the common input/output ports RFVC and RFHC, and present radio frequency signals at the antenna input/output ports RFV1-RFV(N) and RFH1-RFH(N). The signals presented at each of the antenna input/output ports RFV1-RFV(N) and RFH1-RFH(N) are generated by the dual-polarization beamformer circuit 212*i* in response to the radio frequency signals received at the common input/output ports RFVC and RFHC and a respective number of setting values (e.g., gain, phase, etc.) corresponding to each of the antenna input/output ports RFV1-RFV(N) and RFH1-RFH(N).

In an example, the dual-polarization beamformer circuit 212*i* may comprise a block (or circuit) 402, a block (or circuit) 404, a number of blocks (circuits) 406*a*-406*n*, and a block (or circuit) 408. The circuit 402 may implement an interface circuit. In various embodiments, the circuit 402 may implement a digital interface. The circuit 404 may implement a hard-wired address (e.g., chip ID) for the beamformer circuit 212*i*. The circuits 406*a*-406*n* may implement transceiver (TRX) channels. The circuit 408 may implement a 1-N dual-channel combiner/splitter network.

In an example, the signals FSW and CTRL are exchanged with the circuit 402. In an example, the circuit 402 may comprise a serial interface. The circuit 402 may be configured to be compliant with one or more serial interface standards including, but not limited to, serial peripheral interface (SPI), inter-integrated circuit (I²C), daisy chain, etc. In an example, the circuit 402 may be configured to allow programming and control of the dual-polarization beamformer circuit 212*i* using a serial communication link (or bus). In an example, the circuit 402 may be configured to program and control the circuits 406*a*-406*n* in response to the signals CTRL and FSW. In an example, the circuit 402 may control whether the circuits 406*a*-406*n* operate in a transmit mode or a receive mode in response to the signal FSW.

In an example, the circuit 402 may implement a 4-wire embedded SPI core. In an example, the circuit 402 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 402 may include a transmit/receive function switching pin that may receive the signal FSW. In an example, the signals MOSI, MISO, SCLK, and SS/CS may be configured to implement the 4-wire SPI protocol interface as summarized in the TABLE 1 above.

In an example, the circuit 404 may set a physical address of the dual-polarization beamformer circuit 212*i* based upon hardware coded address bits (or pins). In various embodiments, a hard-wired address may be implemented having a number (e.g., X) of input bits (e.g., ADD1, ADD2, . . . , ADD(X)). In an example, the address may be implemented having six bits (or pins). In some embodiments, the hard-wired address may be set to predetermined logic levels (e.g., 0 or 1) by tying a number of address pins to predetermined supply voltages (e.g., GND, VSS, or VDD). In some embodiments, the hard-wired address bits may be hard coded within the chip implementing the beamformer 212*i* during manufacturing. In some embodiments, the hard-wired address bits may be programmed within the chip implementing the beamformer 212*i*. In an example, the hard-wired bits may be programmed using fuses, anti-fuses, or other conventional techniques.

Figure 6:
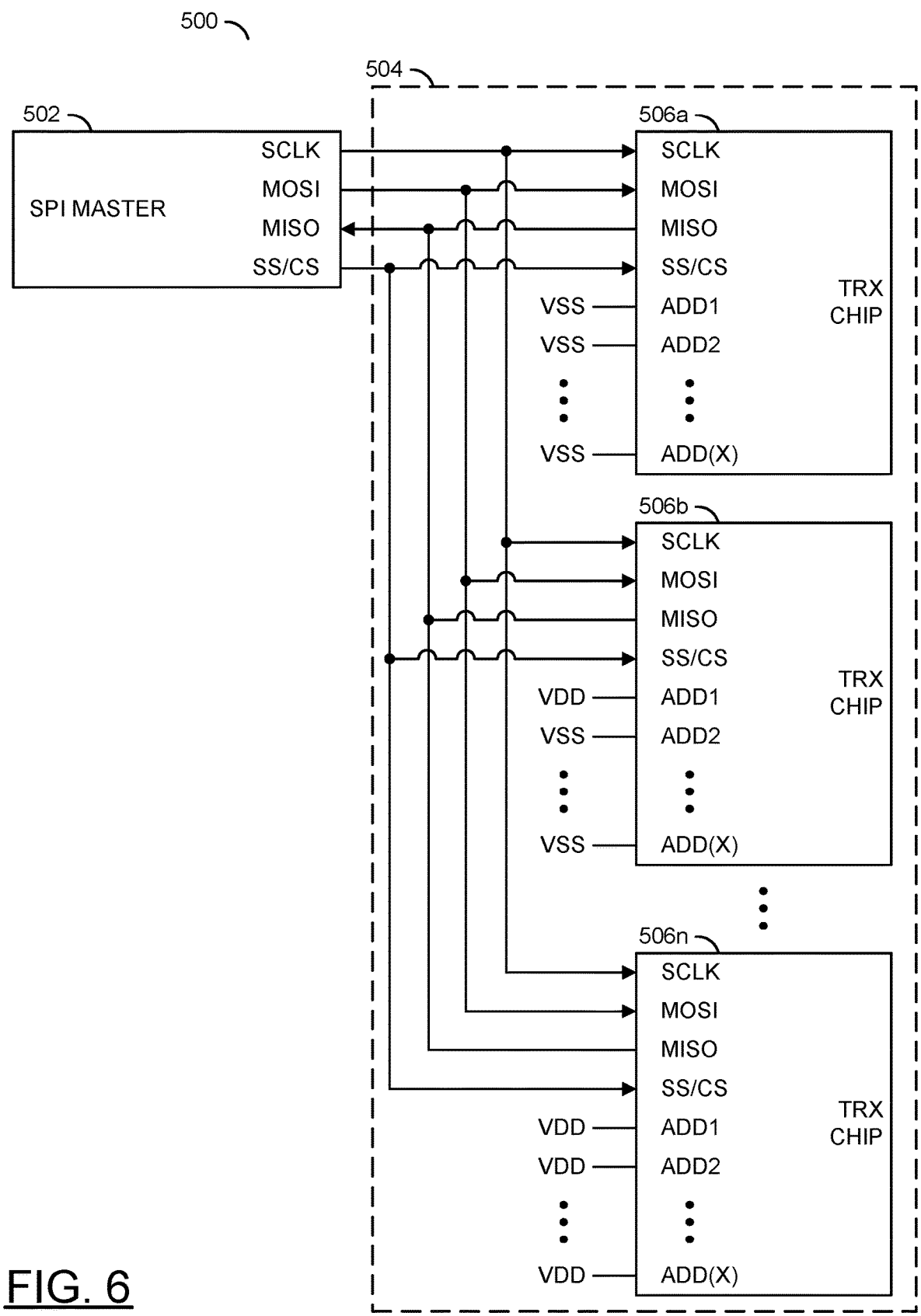
FIG. 6 is a diagram illustrating an example system comprising a serially connected phased array antenna panel.

Referring to FIG. 6, a diagram of a system 500 is shown illustrating a serially connected phased array antenna panel in accordance with an example embodiment of the invention. In an example, the system 500 comprises an SPI Master core 502 and a phased array antenna panel 504. In an example, the SPI Master core 502 may be part of a control circuit similar to the circuit 86 described above in connection with FIG. 1. The phased array antenna panel 504 is illustrated comprising a plurality of transceiver (TRX) chips 506*a*-506*n*. The transceiver (TRX) chips 506*a*-506*n* may implement beamformer circuits similarly to the circuit 112*i* (described above in connection with FIG. 4) or the circuit 212*i* (described above in connection with FIG. 5). In an example, the SPI Master 502 is connected to the transceiver (TRX) chips 506*a*-506*n* by a serial bus carrying the signals SCLK, MOSI, MISO, and SS/CS. In an example, each of the transceiver (TRX) chips 506*a*-506*n* is hard-wired to have a unique address.

In an example, the chip 506*a* may be hard-wired to an address 001 . . . 0, the chip 506*b* may be hard-wired to an address 01 . . . 0, and the chip 506*n* may be hard-wired to an address 11 . . . 1, where VSS represents a voltage level corresponding to the value of 0 and VDD represents a voltage level corresponding to the value of 1. By hard-wiring a unique address for each of the transceiver chips 506*a*-506*n*, separate chip select lines are eliminated, which simplifies layout of the phased array antenna panel 504. For example, a conventional phased array antenna panel with 64 transceiver chips would require an interface with 64 individual chip select lines (e.g., SS/CS) routed on the panel circuit board. The hard-wired addressing scheme in accordance with an embodiment of the invention reduces the interface to a single SS/CS line, regardless of the number of transceiver circuits implemented. Instead, the address of a particular transceiver circuit 506*a*-506*n* to which a communication is directed may be sent to the particular transceiver circuit 506*a*-506*n* as part of the SPI communication. An SPI communication containing an address different from the hard-wired address of a transceiver circuit 506*a*-506*n* may be ignored. In an example, a hard-wired address with X bits generally allows communication to be directed to $2^x$ devices.

Figure 7:
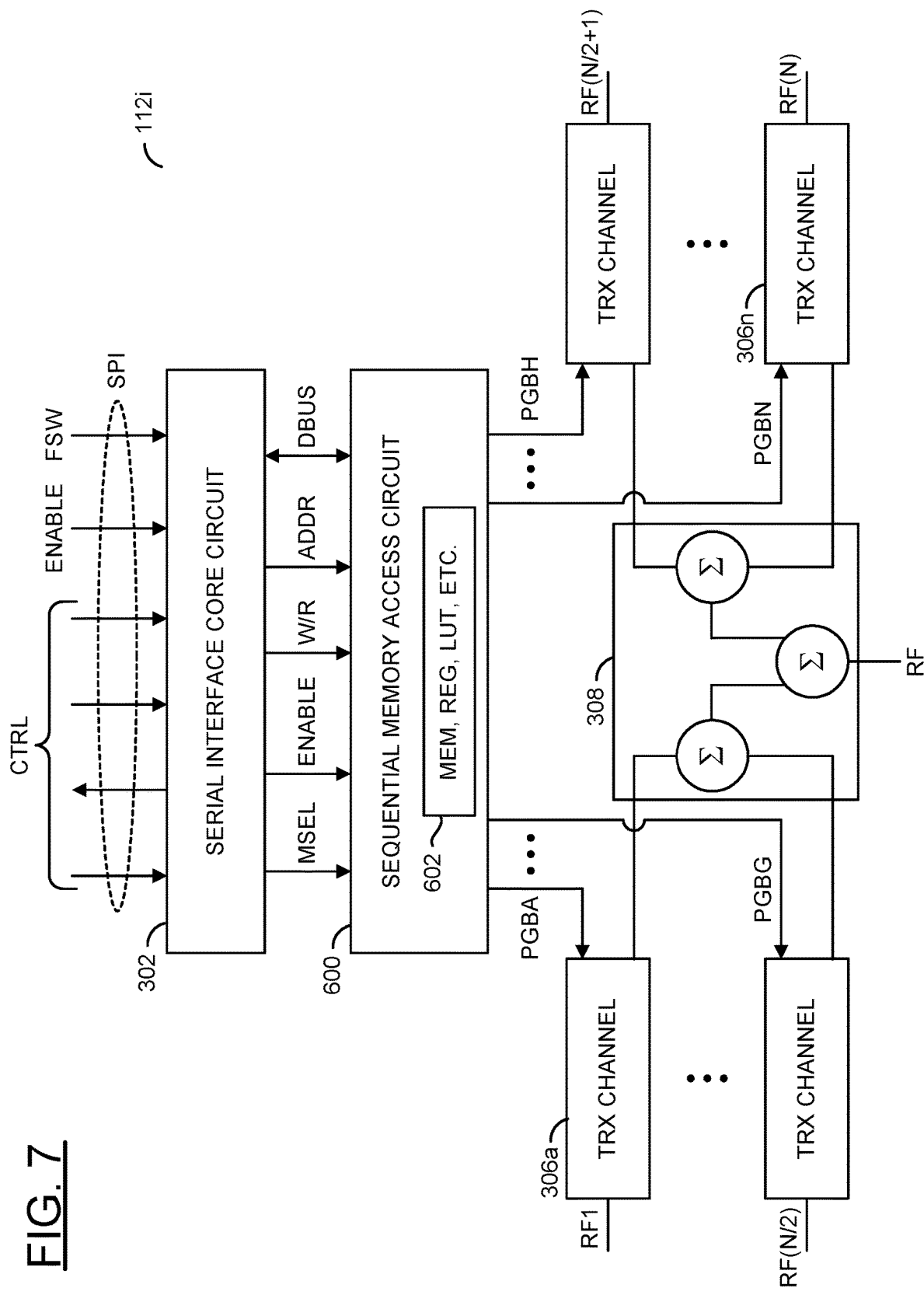
FIG. 7 is a diagram illustrating a fast memory access scheme for beam steering control in accordance with an example embodiment of the invention.

Referring to FIG. 7, a block diagram illustrating an example implementation of a fast memory access architecture in accordance with an embodiment of the invention is shown. In various embodiments, the fast memory access architecture may be utilized to facilitate a multi-mode/multi-chip serial communication protocol (e.g., SPI, I²C, etc.). In an example, the multi-chip serial communication protocol in accordance with an embodiment of the invention may be utilized with phased array/beamformer panels for 5G as well as Satcom applications. The number of chips/ICs that may be controlled through the serial communication protocol is determined by the number of address pins (bits) used in the protocol. In an example where each chip is addressed by X address bits (e.g., ADD1-ADD(X)), a total number of $2^x$ beamformer chips/ICs may be controlled using a single serial stream.

In various embodiments, a multi-mode serial communication protocol is provided to achieve different modes of operation for beamformer systems. In an example, the modes of operation may include, but are not limited to, (i) a static mode (Mode-0) used for general purpose read and write operations to static and/or lookup table (LUT) memory (or registers), (i) a fast beam steering operation comprising sending a LUT address to each chip separately (Mode-1), (iii) a fast beam steering operation comprising sending a global (broadcast) LUT address to all the chips connected to the same serial bus (Mode-2), and/or (iv) a fast beam steering operation comprising sending separate phase and gain bits to each chip separately (Mode-3). The general purpose write/read operation Mode-0 may be used to program beam parameters for a beam space (BS) of a particular application.

In an example where a beamformer system has a beam space of 2000 beams and utilizes beamformer chips/ICs with eight channels, each beamformer chip may comprise a LUT memory (or registers) comprising 2000 entries associating beam parameter sets (e.g., phase, gain, etc.) for each channel to indices (e.g., 0 to 1999) corresponding to each beam (e.g., BS:1 to BS:2000) of the beam space. In various embodiments, the number of beam parameter sets that may be indexed may be an integer N (e.g., 4, 32, 128, 2048, etc.) to provide fast beam steering (redirecting) to N remote devices. Other numbers of sets and/or channels may be implemented to meet the design criteria of a particular application.

In various embodiments, various types of memory (e.g., SRAM, DRAM, static registers, etc.) may be used to implement the LUT (or LUTs) storing the beam parameter sets. However, any type of storage device may be used. In an example, the LUT may comprises 12-bit registers for each entry in the table. However, other bit widths may be implemented to meet design criteria of a particular implementation. Each entry generally has a specific address. The LUT entry addresses generally correspond to the indices associated with the beams of the beam space.

In an example, the beamformer circuit 112i generally comprises the digital interface circuit 302, the transceiver circuits 306a-306n, the combiner/splitter circuit 308, and a block (or circuit) 600. The circuit 600 may comprise a block (or circuit) 602. The circuit 600 may implement a sequential memory access circuit. The circuit 302 and/or the circuit 600 may comprise a control circuit (e.g., processor, controller, embedded controller, etc.) configured to implement fast beam steering operations utilizing the beamformer circuit 112i. The circuit 602 may implement a lookup table (LUT) memory (or registers). The circuit 602 may be configured to store a plurality of beam space parameter sets (e.g., phase, gain, etc.) for each channel of the beamformer circuit 112i. In an example, a lookup table may be implemented in the circuit 602, in which each of a number of beam space parameter sets (e.g., phase and gain values for each of N channels) of a beam space with K beams may be associated with an index (e.g., BS), as illustrated in the following TABLE 2:

TABLE 2

| BS | Channel 1 | | Channel 2 | | ... | | Channel N | |
|---|---|---|---|---|---|---|---|---|
| 1 | P11 | G11 | P12 | G12 | ... | ... | P1N | G1N |
| 2 | P21 | G21 | P22 | G22 | ... | ... | P2N | G2N |
| 3 | P31 | G31 | P32 | G32 | ... | ... | P2N | G3N |
| ... | ... | ... | ... | ... | ... | ... | ... | ... |
| K | PK1 | GK1 | PK2 | GK2 | ... | ... | PKN | GKN |

The circuit 600 may be implemented with hardware, a combination of hardware and software and/or simulated with software. The beamformer circuit 212i of FIG. 5 may be implemented similarly.

The signal(s) CTRL may comprise a number of serial bus signals used to convey data and commands between the controller 68 and the beamformer circuit 112i. In an example, a signal ENABLE may be received by the circuit 302 and transferred to the circuit 600. The signal ENABLE may be an enable signal synchronized to a clock signal received as part of the signal(s) CTRL. The circuit 302 may receive the signal FSW. The signal FSW may be a hard-wired fast T/R switch signal used to switch the beamformer circuit 112i between the transmit mode and the receive mode.

A signal (e.g., MSEL) may be generated by the circuit 302 and received by the circuit 600. The signal MSEL may be a mode select signal that implements a fast beam steering function of the beamformer circuit 112i. The signal ENABLE may be transferred from the controller 68 through the circuit 302 to the circuit 600. The circuit 302 may generate a signal (e.g., W/R) received by the circuit 600. The signal W/R may be a write/read signal. While in a write state, the signal W/R may indicate a write of gain values, phase values and/or bias values into a memory and/or buffers within the circuit 600. While in a read state, the signal W/R may indicate a read of the gain values, the phase values and/or the bias values from the circuit 600. A signal (e.g., ADDR) may be exchanged between the circuit 302 and the circuit 600. The signal ADDR may be an address bus signal used to transfer the various address values (e.g., memory, register, LUT, etc.) between the circuits 302 and 600 along a local address bus. The signal ADDR may communicate register and/or LUT addresses depending upon the commands received by the circuit 302. A signal (e.g., DBUS) may be exchanged between the circuit 302 and the circuit 600. The signal DBUS may be a bidirectional data bus signal used to transfer the various data values between the circuits 302 and 600 along a local data bus. Multiple signals (e.g., PGBA to PGBN) may be generated by the circuit 600 and transferred to the transceiver channel circuits 306a-306n, respectively. Each signal PGBA to PGBN may carry a current phase value (P), a current gain value (G) and/or a current bias value (B) to be used by the corresponding transceiver channel circuits 306a-306n.

The circuit 302 may implement a serial protocol interface (SPI) core circuit. When implemented as a SPI core, the circuit 302 may be operational to provide communications between the beamformer circuit 112i and the controller 68 via the signals CTRL, ENABLE, and FSW. In various embodiments, the circuit 302 may control (or program) the beam parameter values (e.g., gain, phase, etc.) stored in and presented by the circuit 600. The setting values may provide several tens (e.g., 35) of decibels (dB) of gain control for the fields 102a-102n and/or 104a-104n. The beam parameter values may provide multiple bits (e.g., 5 bits) of gain and phase control for the fields 102a-102n and/or 104a-104n. Other gain ranges and/or phase ranges may be implemented to meet the design criteria of a particular application. Loading of the beam parameter values into the memory and/or buffers within the circuit 600 is generally controlled by the mode select signal MSEL and the enable signal ENABLE. A topology of the system 80 generally utilizes a single pad for the signal ENABLE at the circuit 302 to control sequential access to the register layers. The single pad approach generally reduces a number of pads compared with common multi-pad designs that implement random access addressing for the registers.

The circuit 302 may also be operational to control the transmit/receive mode of the transceiver circuits 306a-306n using the fast switching signal FSW. A switching speed from the transmit mode to the receive mode may be fast (e.g., less than or equal to about 30 nanoseconds). A switching speed from the receive mode to the transmit mode may be similarly fast (e.g., less than or equal to about 130 nanoseconds). The fast switching signal FSW may be toggled between the transmit mode and the receive mode at a high frequency (e.g., at least 10 megahertz). Other frequencies of the fast switching signal FSW may be implemented to meet the design criteria of a particular application.

The circuit 600 may implement a sequential memory access circuit (or access circuit for short). The circuit 600 is generally operational to buffer (store) multiple subsets (or layers) of the gain values, the phase values, and/or the bias values for each of the transceiver channel circuits 306a-306n. Each subset (or beam parameter set) comprises values that generally define a beam in the beam space of the beamformer system. In various embodiments, the number of beam parameter sets that may be indexed may be an integer N (e.g., 4, 32, 128, 2048, etc.) to provide fast beam steering (redirecting) to N remote devices in short order. Other numbers of sets may be implemented to meet the design criteria of a particular application.

Figure 8:
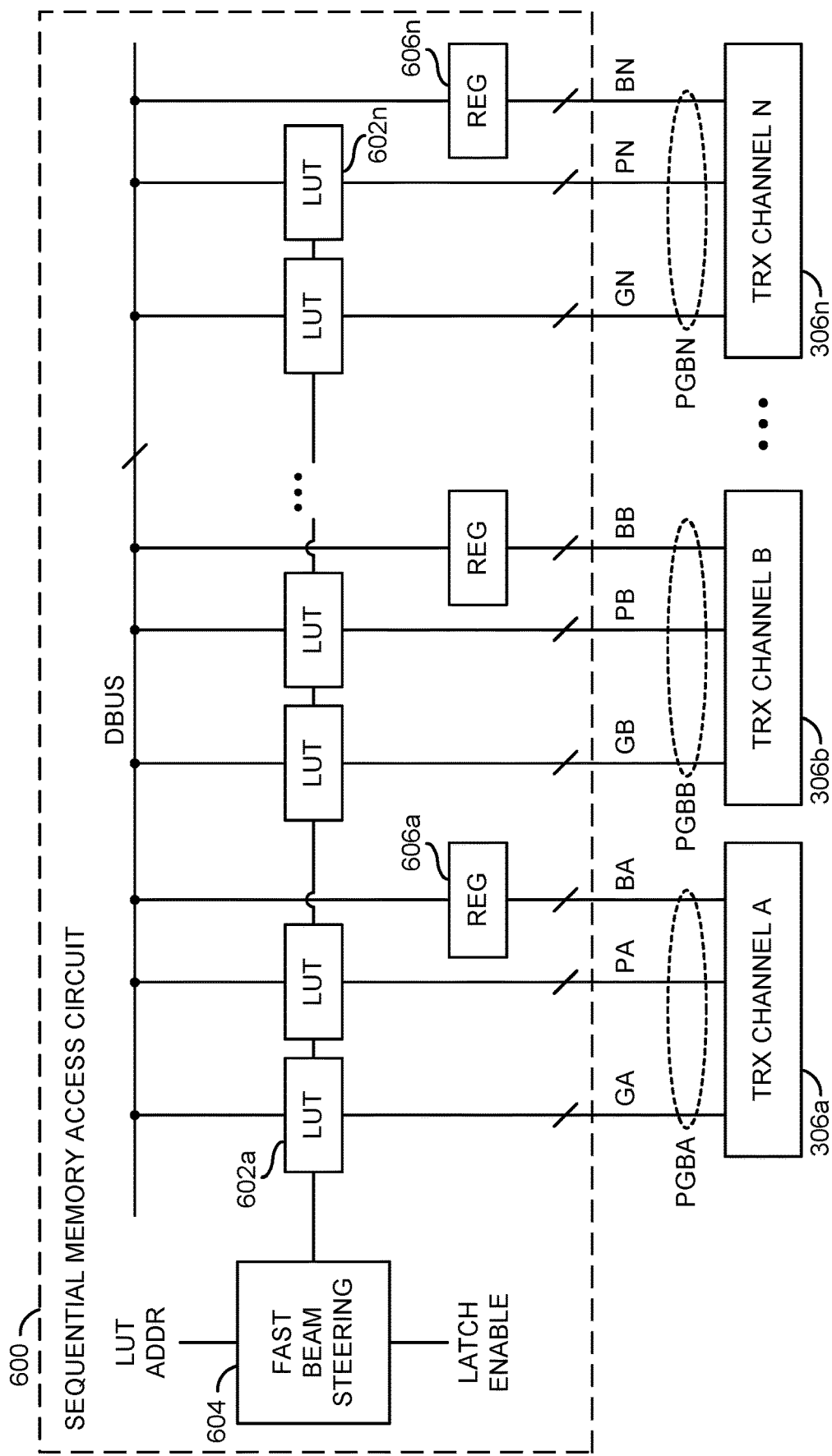
FIG. 8 is a diagram illustrating a beam steering lookup table scheme in accordance with an embodiment of the invention.

Referring to FIG. 8, a block diagram of an example implementation of the access circuit 600 is shown in accordance with an example embodiment of the invention. In an example, the access circuit 600 may comprise multiple blocks (or circuits) 602a-602n, a block (or circuit) 604, and multiple blocks (or circuits) 606a-606n. The circuits 602a-602n may be implemented as individual lookup table memories or as portions of a single lookup table memory. The circuits 602a-602n, 604, and 606a-606n may be implemented with hardware, a combination of hardware and software and/or simulated with software.

The circuit 604 may receive a lookup table address signal LUT ADDR. The circuit 604 may also receive a signal LATCH ENABLE. The circuit 604 may be configured to control the circuits 602a-602n in response to the signals LUT ADDR and LATCH ENABLE. In various embodiments, the circuit 604 may select lookup table entries in the circuits 602a-602n based upon the signal LUT ADDR, and upon assertion of the signal LATCH ENABLE present values stored in the selected entries to the circuits 306a-306n. The bidirectional data bus signal DBUS may be exchanged between the SPI core circuit 302 and the circuits 602a-602n. In some embodiments, data values in the data bus signal DBUS may implement multi-bit (e.g., 8-bit, 12-bit, 16-bit, etc.) data values. In an example, the data values stored in the circuits 602a-602n may comprise gain and phase parameters. Multiple signals (e.g., GA to GN) may be presented by some of the circuits 602a-602n to the corresponding transceiver channel circuits 306a-306n. Each signal GA to GN may convey a gain value. In various embodiments, the gain values may be multi-bit (e.g., 4-bit, 6-bit, 12-bit, 16-bit, etc.) values. Multiple signals (e.g., PA to PN) may be presented by some of the circuits 602a-602n to the corresponding transceiver channel circuits 306a-306n. Each signal PA to PN may convey a phase value. The phase values may also be multi-bit (e.g., 4-bit, 6-bit, 12-bit, 16-bit, etc.) values. The signals GA-GN and PA-PN may be implemented with the same or different numbers of bits. Multiple signals (e.g., BA to BN) may be presented by the circuits 606a-606n to the corresponding transceiver channel circuits 306a-306n. Each signal BA to BN may carry a bias value. In an example, the bias values in the signals BA to BN may be used to trim the transceiver channel circuits 306a-306n. In some embodiments, the bias values in the signals BA to BN may be multi-bit (e.g., 4-bit, 6-bit, 12-bit, 16-bit, etc.) values. The signals GA-GN, PA-PN, and BA-BN may be implemented with the same or different numbers of bits.

The circuit 604 may implement a fast beam steering circuit. The fast beam steering circuit 604 is generally operational to particular entries in the LUT circuits 602a-602n in response to the signal LATCH ENABLE and the lookup table address signal LUT ADDR. The latch enable signal LATCH ENABLE may be in either the asserted state (e.g., a high voltage or a logical one state) or a hold state (e.g., a low voltage or a logical zero state).

While the signal LATCH ENABLE is in, or transitions to, the hold state, the fast beam steering circuit 604 may place all the outputs of the LUT circuits 602a-602n in a deasserted state (e.g., presenting high-impedance states (or conditions) at the LUT output ports (or nodes). While the signal LATCH ENABLE is in, or transitions to, the asserted state, the fast beam steering circuit 604 may be configured to place all the outputs of the LUT circuits 602a-602n in an asserted state (e.g., presenting the values in the LUT entries addressed by the signal LUT ADDR at the LUT output ports (or nodes). When the LUT circuits 602a-602n are in the asserted state, each asserted of the circuits 602a-602n presents the selected gain values and the selected phase values at the output ports to the transceiver channel circuits 306a-306n. The transceiver channel circuits 306a-306n may use the phase value and the gain values to control the amplitude and relative phases of the radio frequency signals RF1-RF(N) (or RFV1-RFV(N) and RFH1-RFH(N) in the dual-polarization embodiments) thereby steering and/or altering the geometry of the fields 102a-102n and/or 104a-104n.

The circuits 606a-606n may implement register circuits. The registers 606a-606n are generally operational to buffer bias values for the corresponding transceiver channel circuits 306a-306n. In various embodiments, the registers 606a-606n may be configured to hold the values received from and transferred in the data bus signal DBUS and the signals BA to BN. The bit widths of the signals BA to BN may be implemented to meet the design criteria of a particular application.

The registers 606a-606n are generally operated independently from the LUT circuits 602a-602n. The registers 606a-606n may present the buffered bias values to the transceiver channel circuits 306a-306n in both the transmit mode and the receive mode. The buffered bias values may be presented independently of which lookup table entries are active or inactive.

The phase values, the gain values and the bias values may be written into and read from the LUT circuits 602a-602n and registers 606a-606n by the SPI core circuit 302 several bits at a time. The write data and/or read data may be transferred between the SPI core circuit 302 and the LUT circuits 602a-602n and registers 606a-606n in the data bus signal DBUS. The write/read direction may be based on the signal W/R.

The write data values may be received by the SPI core circuit 302 via the serial input signal MOSI from the controller 86 and the gain/phase table 88. While the signal W/R is in the write state (or mode), the write data values may be presented from the SPI core circuit 302 via the data bus signal DBUS to the LUT circuits 602a-602n and/or the registers 606a-606n. The write data values may be subsequently stored in the LUT circuits 602a-602n and/or the registers 606a-606n.

While the signal W/R is in the read state (or mode), read data values may be read from the LUT circuits 602a-602n and/or the registers 606a-606n. The read data value may be transferred from the LUT circuits 602a-602n and/or the registers 606a-606n via the data bus signal DBUS to the SPI core circuit 302. The SPI core circuit 302 may subsequently transfer the read data values to the controller 86 via the serial output signal MISO.

Figure 9:
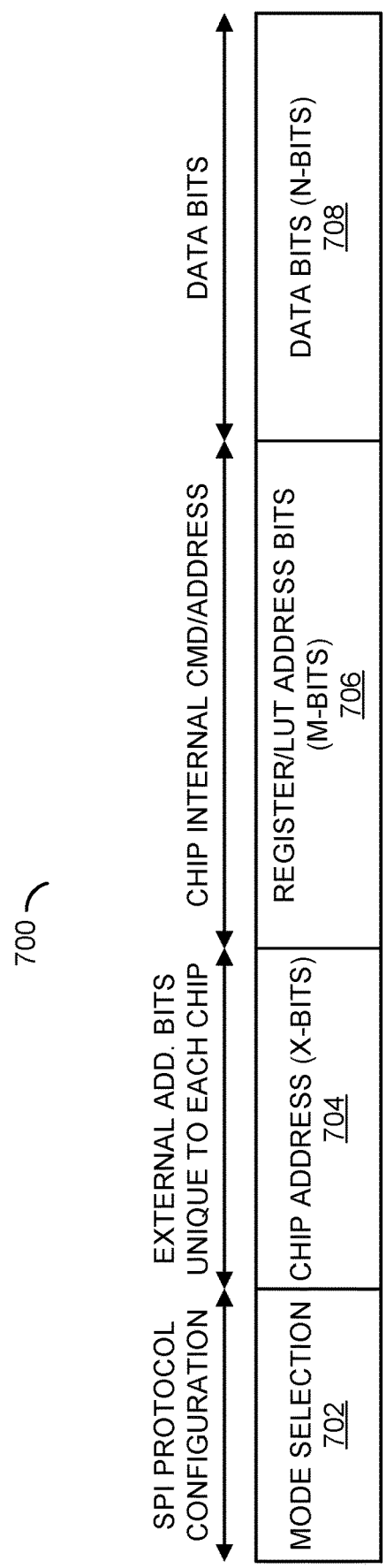
FIG. 9 is a diagram of illustrating an example interface protocol in accordance with an embodiment of the invention.

Referring to FIG. 9, a diagram is shown illustrating an example of a serial interface of a phased array antenna panel in accordance with an example embodiment of the invention. In embodiments implementing a SPI protocol, each SPI transaction 700 generally includes a mode selection portion 702, a chip address portion 704, a command/configuration portion 706, and a data portion 708. The order of the portions 702-708 may be varied to meet the design criteria of a particular implementation. For example, in some embodiments the chip address portion 704 may be received first followed by the mode selection portion 702, the register address portion 706 and the data portion 708.

In various embodiments, the mode selection portion 702 specifies whether a programming operation or fast beam steering operation is being performed. In an example, the mode selection portion 702 may comprise two bits, allowing selection between four modes (e.g., 00, 01, 10, 11). However, other numbers of bits may be implemented to meet design criteria of a particular implementation. In an example, a mode 0 (00) may specify the standard Write/Read operation to the static and Look-up-Table (LUT) registers, a mode 1 (01) may specify the fast beam steering operation comprising sending an LUT address to each chip separately, a mode 2 (10) may specify the fast beam steering operation comprising sending a global (broadcast) LUT address to all the chips connected to the same SPI bus, and a mode 3 (11) may specify the fast beam steering operation comprising sending separate phase and gain bits to each chip separately. The number of mode selection bits may be varied according to the number of modes available in a particular implementation.

In various embodiments, the address portion 704 contains the hard-wired address of the transceiver circuit (or chip) to which the transaction is directed, the command/configuration portion 706 may specify information concerning an action (e.g., write, read, buffer, load, internal address, etc.), and the data portion 708 may contain any data bits to be written to the addressed transceiver circuit(s). In an example, the command/configuration portion 706 may identify an internal address (e.g., a memory location, a register address, or an index into the LUT within the addressed beamformer circuit(s)) to be programmed with the data contained in the data portion 708. In an example, the command/configuration portion 706 may also identify whether the operation is directed to a particular channel polarization (e.g., vertical, horizontal) and/or number. The number of mode bits, address bits, configuration bits, and data bits may be varied to meet the design criteria of a particular implementation. The order in which the configuration bits and the data bits are placed may be varied to meet the design criteria of a particular implementation. In an example, a most significant bit (MSB) may come first in time in each portion 706 and 708. In another example, the least significant bit (LSB) may come first in time in each portion 706 and 708.

Figure 10:
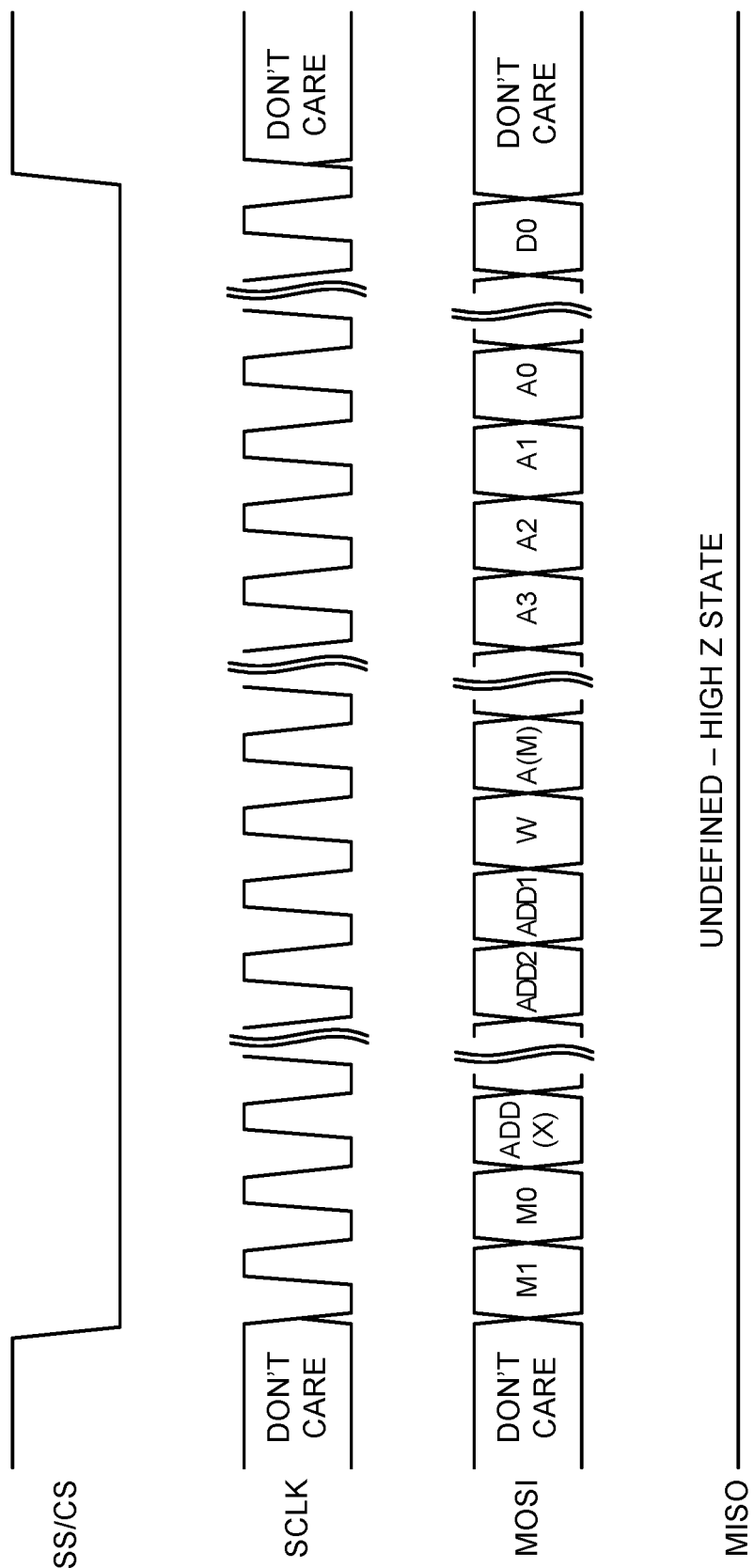
FIG. 10 is a diagram illustrating a write operation to a phased array antenna panel in accordance with an example embodiment of the invention.

Referring to FIG. 10, a diagram is shown illustrating an example of a write operation to a phased array antenna panel in accordance with an example embodiment of the invention. For each write operation, the signal SS/CS may be pulled down (e.g., LOW or a logic 0) and an input sequence may be sent on the MOSI line. The input sequence is generally sent synchronously with the clock signal SCLK. In an example, each bit of the input sequence may be sampled on a rising edge of the clock signal SCLK. At the end of each write operation, the signal SS/CS may be pulled up (e.g., HIGH or a logic 1) to complete the operation. The write operation is performed only if the hard-wired address of the particular beam forming circuit matches the address specified in the input sequence. Otherwise, the beam forming circuit does not start the write operation. During a write operation, the MISO line is generally in a high-Z impedance mode.

Figure 11:
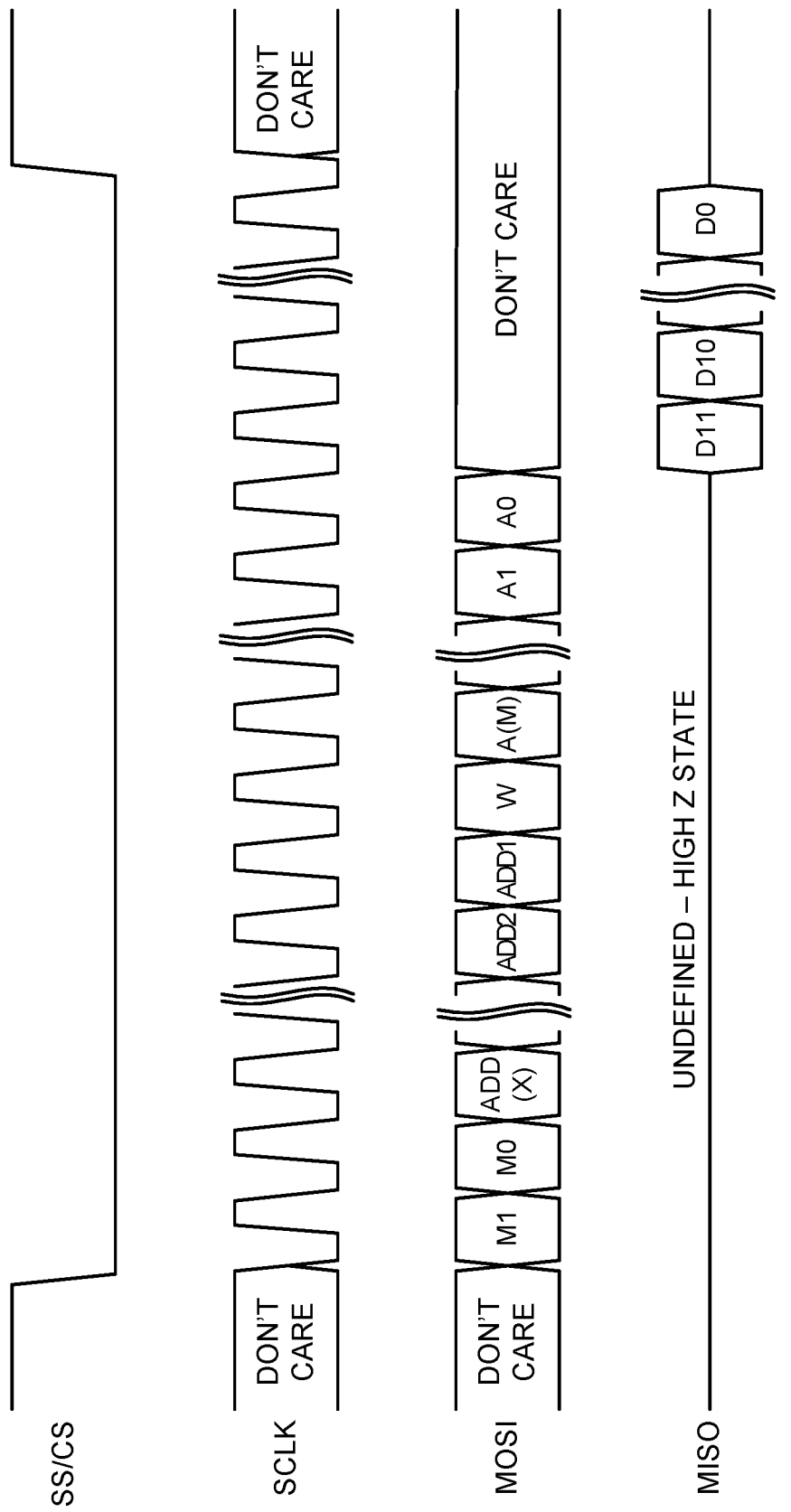
FIG. 11 is a diagram illustrating a read operation of a phased array antenna panel in accordance with an example embodiment of the invention.

Referring to FIG. 11, a diagram is shown illustrating an example of a read operation to a phased array antenna panel in accordance with an example embodiment of the invention. In an example, a read operation may be performed for each set of data bits to be read. For each read operation, the signal SS/CS may be pulled down (e.g., LOW or a logic 0) and an input sequence may be specifying parameters of the particular read operation. The input sequence may be sent synchronously with the clock signal SCLK. In an example, each bit of the input sequence may be sampled on a rising edge of the clock signal SCLK. At the end of each read operation, the signal SS/CS is pulled up (e.g., HIGH or a logic 1) to complete the operation. The read operation is performed only if the hard-wired address of the particular beam forming circuit matches the address specified in the input sequence. Otherwise, the particular beam forming circuit does not start the read operation. During a read operation, the MISO line is active. In the data portion 708 of the operation 700, the particular beam forming circuit addressed communicates the expected data values requested by the configuration portion 706 on the MISO line. During the read operation, only one of the beam forming circuits (e.g., 112a-112m or 212a-212m) on one panel should be selected at a time. When the read operation is complete, the MISO line returns to the high-Z impedance mode.

Figure 12:
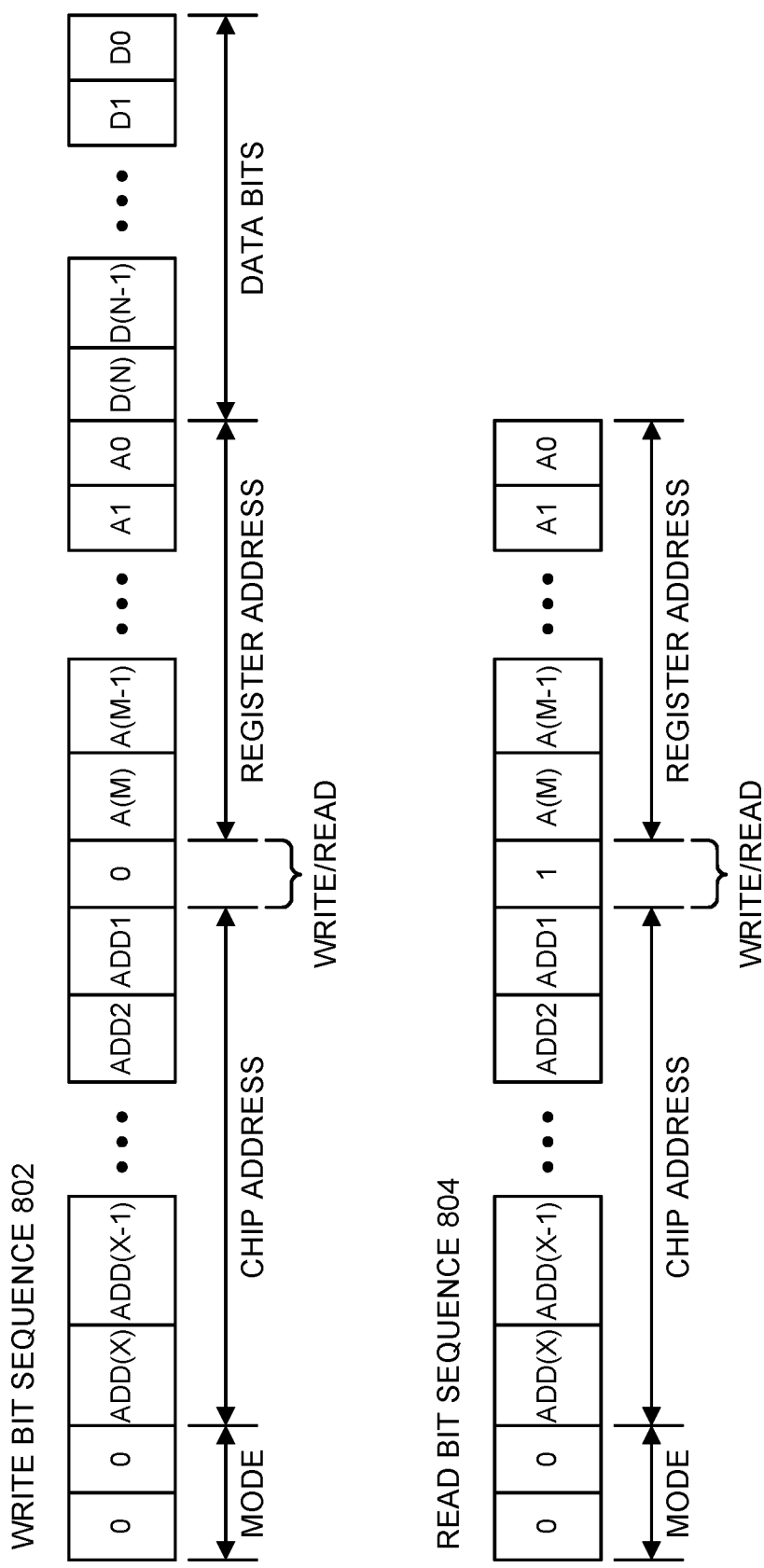
FIG. 12 is a diagram illustrating static write and read operations in accordance with an example embodiment of the invention.

Referring to FIG. 12, a diagram is shown illustrating a static write operation 802 and a static read operation 804 in accordance with an example embodiment of the invention. In an example, the bits of the mode selection portion 702 may be set to select the static write/read mode of operation (e.g., Mode-00). The static write operation 802 and read operation 804 are performed as a regular SPI operation. The mode selection portion 702 is followed by the chip address portion 704. The chip address portion 704 determines which chip is to be communicate with. Un-selected chips will generally be listening and not active. Following the chip address portion 704, the command/configuration portion 706 provides a bit indicating whether a write or read operation is requested and the register address to choose the specific register or LUT entry to write/read. In a write operation, the data bits are sent by the SPI master to the chip in the data portion 708. In a read operation, the data bits portion 708 is communicated to the SPI master separately. In the static write/read operation mode, the length of the SPI protocol depends on the number of chip address bits, chip register address bits, and data bits. In various embodiments, the beam parameters (e.g., phase, gain, etc.) that are pointed to in the fast beam steering modes are generally loaded using the static write/read mode.

In an example, Mode-00 operations may include, but are not limited to, configuring bias and independent channel settings, reading all accessible register and LUT contents, and loading channel parameters (e.g., phase, gain, etc.) into beam code storage LUT units utilized by the fast beam steering Mode-01. In various embodiments, there may be two different READ and WRITE configurations. In an example, the particular mode requested may be specified (e.g., by a bit) in the SPI command. A first mode may be utilized for register access and a second mode may be utilized for LUT access. The first mode (e.g., static register write/read) may be used to access the available registers for configuring and controlling the beamformer chips and individual RF channels. In an example, the register access may be defined by a bit in the SPI command being a logic LOW or "0". In some embodiments, a continuous write may be supported by appending additional data sets at the end of a first data set. Any data sets appended may be stored in consecutive register addresses.

The second mode (e.g., static LUT write/read) may be used to access the available LUT(s) for beam states (channel settings). In an example, a plurality of LUT addresses may be available with each address storing information for a plurality of channels (e.g., phase and gain settings). In an example, LUT access may be defined by a bit in the SPI command being set a logic high or "1". When loading phase and gain settings into a particular LUT address, channel selection may be needed. Channel selection may be defined by additional bits in the SPI command. In some embodiments, a continuous write may be supported by appending additional data sets at the end of a first data set. Any data sets appended may be stored in continuous channel allocations and LUT addresses.

Figure 13:
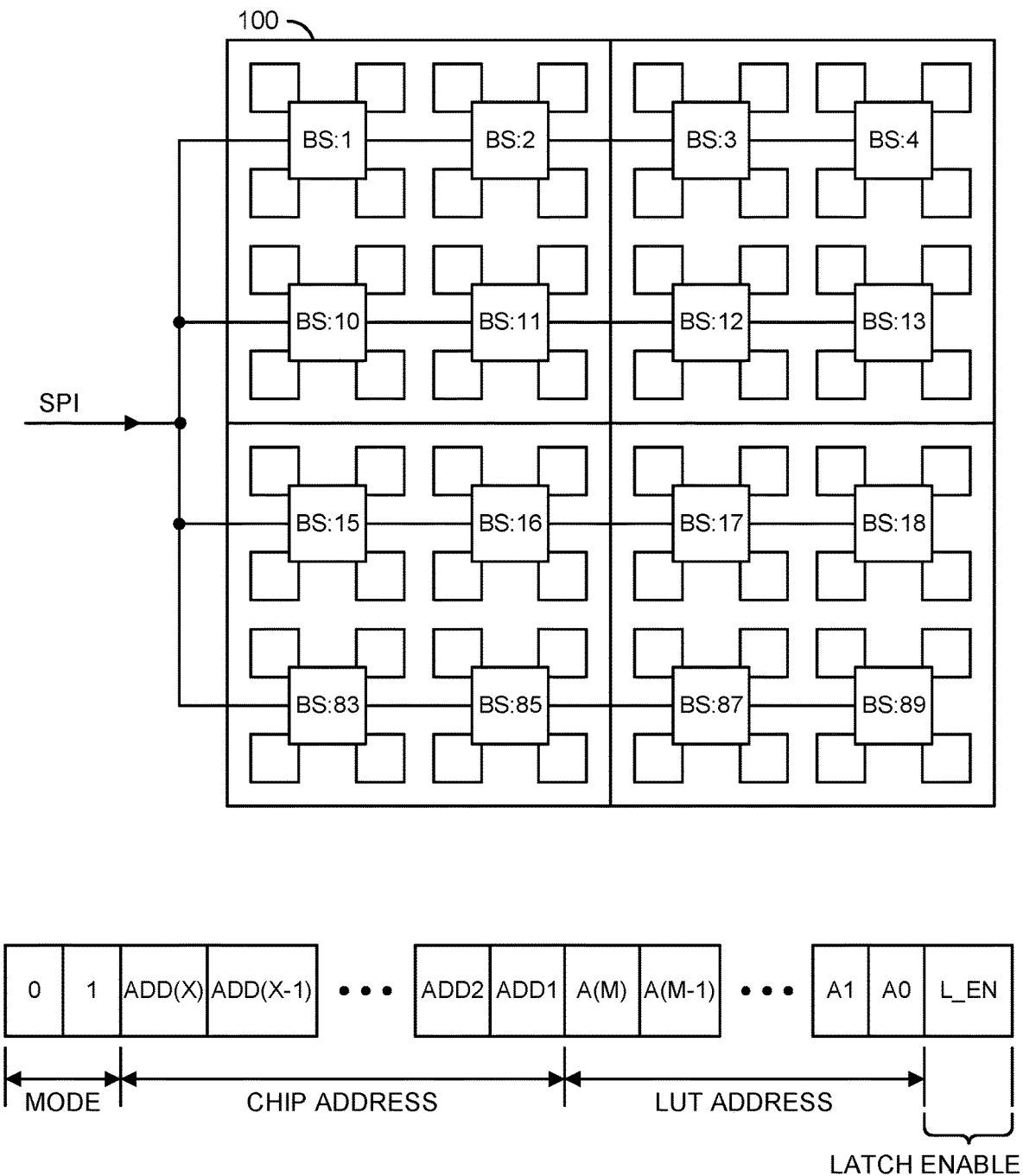
FIG. 13 is a diagram illustrating a fast beam steering mode in accordance with an example embodiment of the invention.

Referring to FIG. 13, a diagram of the phased array antenna panel 100 is shown illustrating a fast beam steering mode operation in accordance with an example embodiment of the invention. The fast beam steering mode 1 operation is generally implemented as a write only operation. There is generally no read operation associated with the mode 1 operation. In an example, the fast beam steering mode 1 generally allows for fast configuration of all the phase and gain settings for all RF channels in the beamformer chip through pre-loaded beam states in memory. The fast beam steering mode 1 provides a local option, which may be used for programming a single chip with the use of the device address. In the mode 1 operation, the mode bits are set as "01". The chip address is selected by the address bits ADD(X) through ADD1. The command includes a LUT address that points to pre-loaded channel phase and gain settings. The command may also include information specifying which polarization (e.g., vertical or horizontal) channels to configure and/or which transmission path (e.g., TX or RX) channels to configure.

Each entry associated with an LUT address generally stores phase and gain data (values) for all of the channels of the respective beamformer chip. The LUT address is generally sent for each beamformer chip separately. Each beamformer chip is generally configured to point to pre-loaded phase and gain bits for the desired beam state (BS). In an example, each beamformer chip of the beamforming phased array antenna panel 100 may be set to a different beam state (BS) or LUT address (e.g., BS:1, BS:2, . . . , BS:89). In general, sixteen SPI commands may be used to program each chip in a phased array antenna panel with sixteen beamformer chips.

The command also includes a latch enable bit (e.g., L_EN) that controls loading of the channel settings. The signal L_EN generally implements an enable signal that loads the values of the selected LUT address to the beamformer chip. In an example, the latch enable signal LEN may be asserted (e.g., set to a logic HIGH or "1") to indicate that the updated channel settings will be loaded immediately. When the signal L_EN is deasserted (e.g., set to a logic LOW or "0") at the end of the SPI command, the beamformer chip does not load the values immediately. Instead, a logic low or "0" indicates that the updated channel settings will be stored into a buffer until another fast beam steering mode 1 command is received with the L_EN bit set to "1". The beamformer chip waits for the signal L_EN to be asserted (e.g., a logic HIGH or "1") to load the values contained in the selected LUT address. The L_EN feature may be useful when vertical and horizontal channel settings need to be loaded simultaneously.

Referring to FIG. 14, a diagram of the phased array antenna panel 100 is shown illustrating a fast beam steering mode operation in accordance with an example embodiment of the invention. The fast beam steering mode 2 operation is generally implemented as a write only operation. There is generally no read operation associated with the mode 2 operation. The fast beam steering mode 2 provides a global option, which may be used for programming all beamformer chips connected to the SPI master. In the mode 2 operation, the mode bits are set as "10". There is no chip address selection in the mode 2 operation. Every command is listened to and executed by all of the beamformer chips connected to the same serial bus.

Each entry associated with an LUT address generally stores phase and gain data (or values) for all of the channels of the respective beamformer chip. Each beamformer chip may be configured to point to pre-loaded phase and gain bits for the same beam state (BS). In an example, each beamformer chip of the beamforming phased array antenna panel 100 may be set to the same beam state (BS) or LUT address (e.g., BS:1). In general, a single SPI command may be used to program all of the beamformer chips in the phased array antenna panel 100, regardless of the number of beamformer chips.

The command also includes a latch enable bit (e.g., L_EN) that controls loading of the channel settings. The signal L_EN generally implements an enable signal that loads the values of the selected LUT address to the beamformer chip. In an example, the latch enable signal L_EN may be asserted (e.g., set to a logic HIGH or "1") to indicate that the updated channel settings will be loaded immediately. When the signal L_EN is deasserted (e.g., set to a logic LOW or "0") at the end of the SPI command, the beamformer chip does not load the values immediately. Instead, a logic low or "0" indicates that the updated channel settings will be stored into a buffer until another fast beam steering mode 1 command is received with the L_EN bit set to "1". The beamformer chip waits for the signal L_EN to be asserted (e.g., a logic HIGH or "1") to load the values contained in the selected LUT address. The L_EN feature may be useful when vertical and horizontal channel settings need to be loaded simultaneously.

Figure 15:
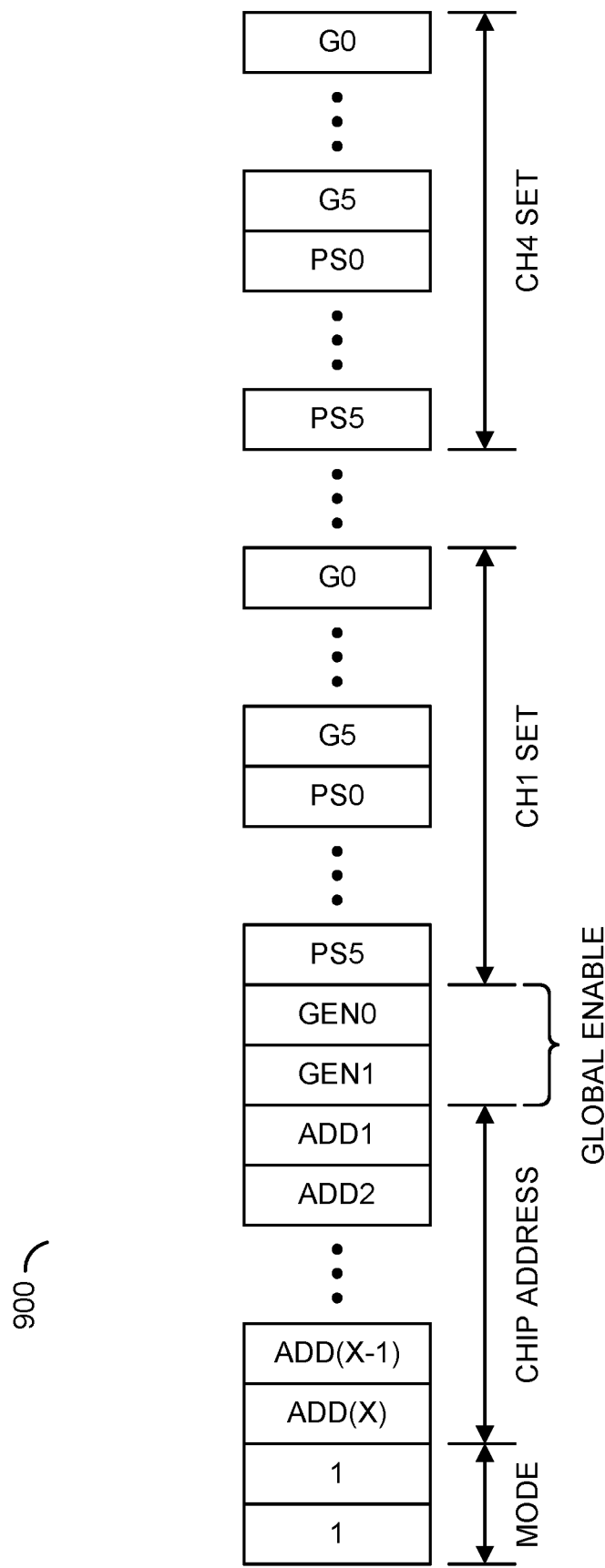
FIG. 15 is a diagram illustrating yet another fast beam steering mode in accordance with an example embodiment of the invention.

Referring to FIG. 15, a diagram is shown illustrating a fast beam steering mode 3 operation in accordance with an example embodiment of the invention. The fast beam steering mode 3 operation is generally implemented as a write only operation. There is generally no read operation associated with the mode 3 operation. In an example, the fast beam steering mode 3 generally allows for programming of all the phase and gains settings for all RF channels through a single SPI command. In the fast beam steering mode 3, the beam state of the beamformer chip or system, is updated by individually indicating the phase and gain settings of each RF channel in the SPI command. In the mode 3 operation, the mode bits are set as "11". The mode 3 operation may be faster than the static write/read mode 0, where each phase and gain of each channel is set using the static write mode.

In the mode 3 command, the mode selection portion 702 is followed by the chip address portion 704. The chip address portion 704 determines which beamformer chip is to be communicated with. Un-selected chips will generally be listening and not active. Following the chip address portion 704, global enable bits (e.g., GEN1 and GEN0) are sent, followed by the phase and gain values to be loaded at the end of the operation. To ensure that multiple chips in a phased-array system update at the same time while programming in the fast beam steering mode 3, the global enable (GEN) bits in the SPI command generally act as an indicator of when the RF channel settings should be latched from the buffer and made active. When chips are still in the process of being programmed, the updated phase and gain settings are stored in a buffer while the GEN bits are set to buffer the settings. The chips in the system will read the GEN bits, regardless of the chip address in the SPI command. When the GEN bits are set to load settings, the phase and gain settings of all the ICs programmed may latch the newly programmed settings from the buffer. This method minimizes distortion to the beam while programming and transitioning to a new beam state.

The fast beam steering mode 3 may be configured for local and global mode. In the local mode, only a single chip is programmed based on the SPI command chip address. In the global mode, all the chips within the same SPI master and BUS are programmed at the same time, ignoring the chip address portion 704. In the Global mode, all the chips are generally programmed to the same setting.

Figure 16:
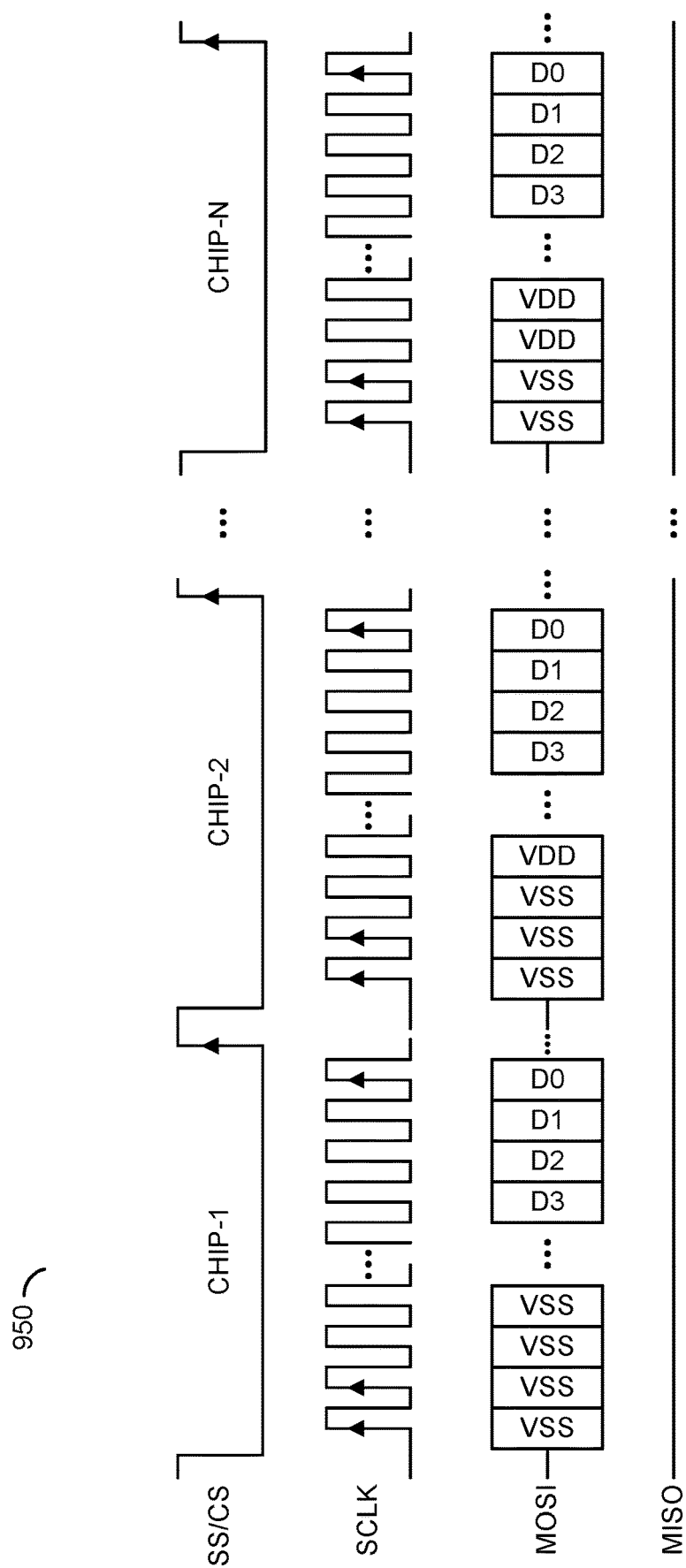
FIG. 16 is a diagram illustrating an example of a serial communication stream for programming multiple beamformer chips in accordance with an example embodiment of the invention.

Referring to FIG. 16, a diagram is shown illustrating an example communication timing for writing to multiple beamformer circuits on a phased array antenna panel in accordance with an example embodiment of the invention. In an example with N chips, a first chip (e.g., CHIP-1) may be hard-wired to an address 0000, a second chip (e.g., CHIP-2) may be hard-wired to an address 0100, and a third chip (e.g., CHIP-N) may be hard-wired to an address 1111. In an example, a communication sequence to write to the three chips may include input sequences that have address portions containing the addresses for the three chips (e.g., 0000, 0100, and 1111, where VSS represents a voltage level corresponding to the value of 0 and VDD represents a voltage level corresponding to the value of 1).

Figure 17:
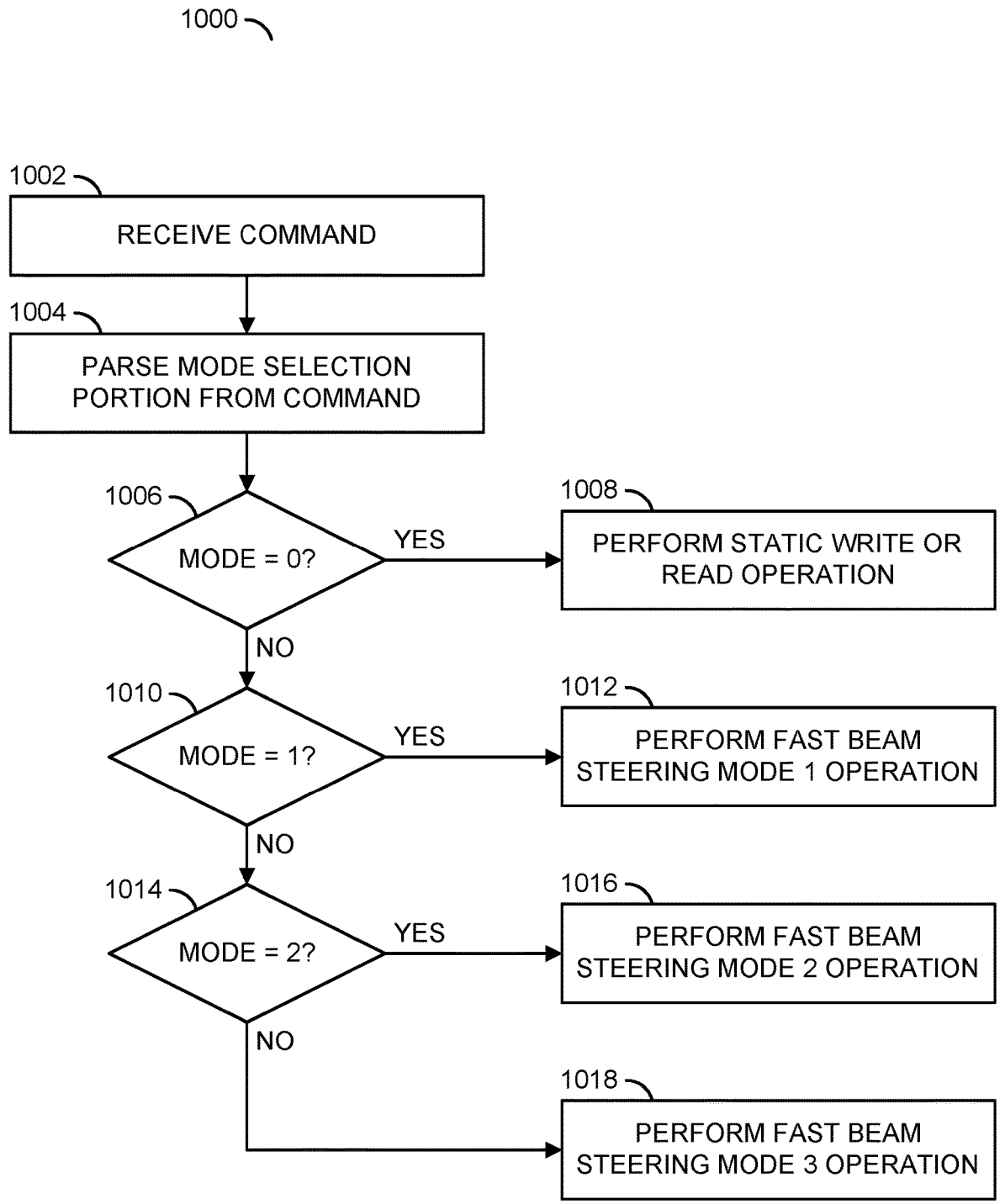
FIG. 17 is a flow diagram illustrating a mode selection process in accordance with an example embodiment of the invention.

Referring to FIG. 17, a flow diagram is shown illustrating a mode selection process 1000 in accordance with an example embodiment of the invention. The process (or method) 1000 generally comprises a step (or state) 1002, a step (or state) 1004, a decision step (or state) 1006, a step (or state) 1008, a decision step (or state) 1010, a step (or state) 1012, a decision step (or state) 1014, a step (or state) 1016, and a step (or state) 1018. In the step 1002, the interface circuit 302 may receive a SPI transaction containing an operation to be performed. Next, the method 1000 may move to the step 1004. In the step 1004, the circuit 302 may parse the mode selection portion 702 from the operation 700. The method 1000 may then move to the decision step 1006, where the mode selection portion is checked for a value of 0. If the value of the mode selection portion is 0, the method 1000 may move to the step 1008. In the step 1008, the circuit 302 may initiate performance of a static write or read operation (described below in connection with FIG. 18). In the decision step 1006, if the value of the mode selection portion is not 0, then the method 1000 may move to the decision step 1010.

In the decision step 1010, the circuit 302 may determine whether the mode selection portion is 1. If the value of the mode selection portion is 1, the method 1000 may move to the step 1012. In the step 1012, the circuit 302 may initiate performance of a fast beam steering mode 1 operation (described below in connection with FIG. 19). In the decision step 1010, if the value of the mode selection portion is not 1, then the method 1000 may move to the decision step 1014.

Figure 18:
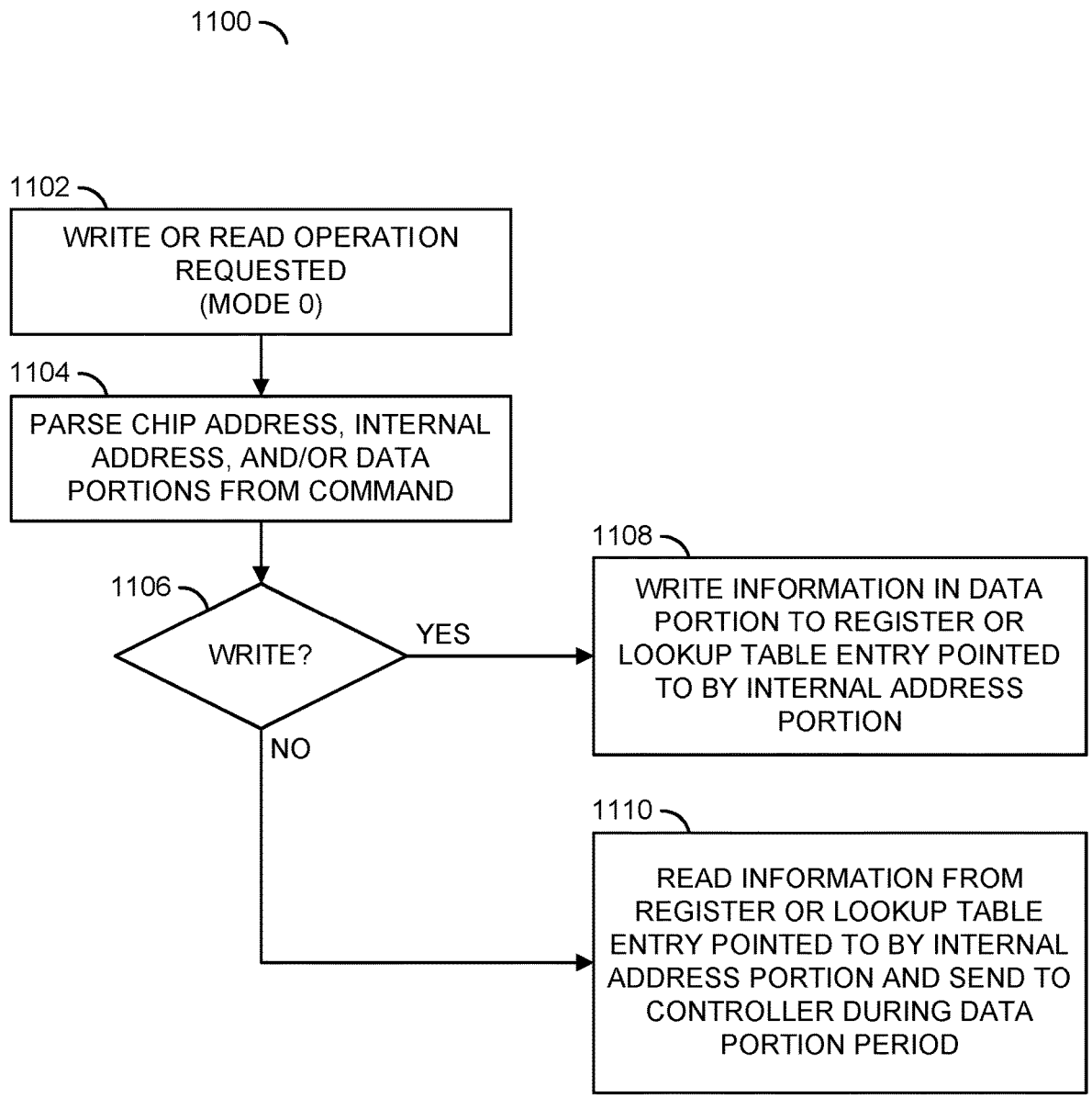
FIG. 18 is a flow diagram illustrating a static write/read operation in accordance with an example embodiment of the invention.

In the decision step 1014, the circuit 302 may determine whether the mode selection portion is 2. If the value of the mode selection portion is 2, the method 1000 may move to the step 1016. In the step 1016, the circuit 302 may initiate performance of a fast beam steering mode 2 operation (described below in connection with FIG. 20). In the decision step 1014, if the value of the mode selection portion is not 2, then the method 1000 may move to the decision step 1018. In the step 1018, the circuit 302 may initiate performance of a fast beam steering mode 3 operation (described below in connection with FIG. 21). The process 1000 may be repeated for each SPI transaction received by the circuit 302. Referring to FIG. 18, a flow diagram is shown illustrating a static write/read operation 1100 in accordance with an example embodiment of the invention. The process (or method) 1100 generally comprises a step (or state) 1102, a step (or state) 1104, a decision step (or state) 1106, a step (or state) 1108, and a step (or state) 1110. In the step 1102, the interface circuit 302 may receive a request for a static write or read operation to be performed. Next, the method 1100 may move to the step 1104. In the step 1104, the circuit 302 may parse the chip address portion 704, the internal address portion 706, and/or the data portion 708 from the operation 700. The method 1100 may then move to the decision step 1106, where the circuit 302 or the circuit 600 determine whether a write operation is requested. In an example, a bit in the internal address portion 706 may be used to specify whether a write or a read operation is requested. In some embodiments, the internal address portion 706 may also be configured (e.g., using one or more bits) to specify whether the target of the write or read operation is a register, a lookup table entry, and/or a particular channel portion (e.g., receive, transmit, etc.) in the lookup table.

When a write operation is requested, the method 1100 may move to the step 1108. In the step 1108, the circuit 302 or the circuit 600 in the chip with the address specified in the chip address portion 704 may write the information contained in the data portion 708 to the target register or lookup table entry pointed to by the internal address portion 706. In the decision step 1106, if a read operation is requested, the method 1100 may move to the step 1110. In the step 1110, the circuit 302 or the circuit 600 in the chip with the address specified in the chip address portion 704 may read the information contained in the target register or lookup table entry pointed to by the internal address portion 706 and send the read data to the controller during the data portion 708 period.

Figure 19:
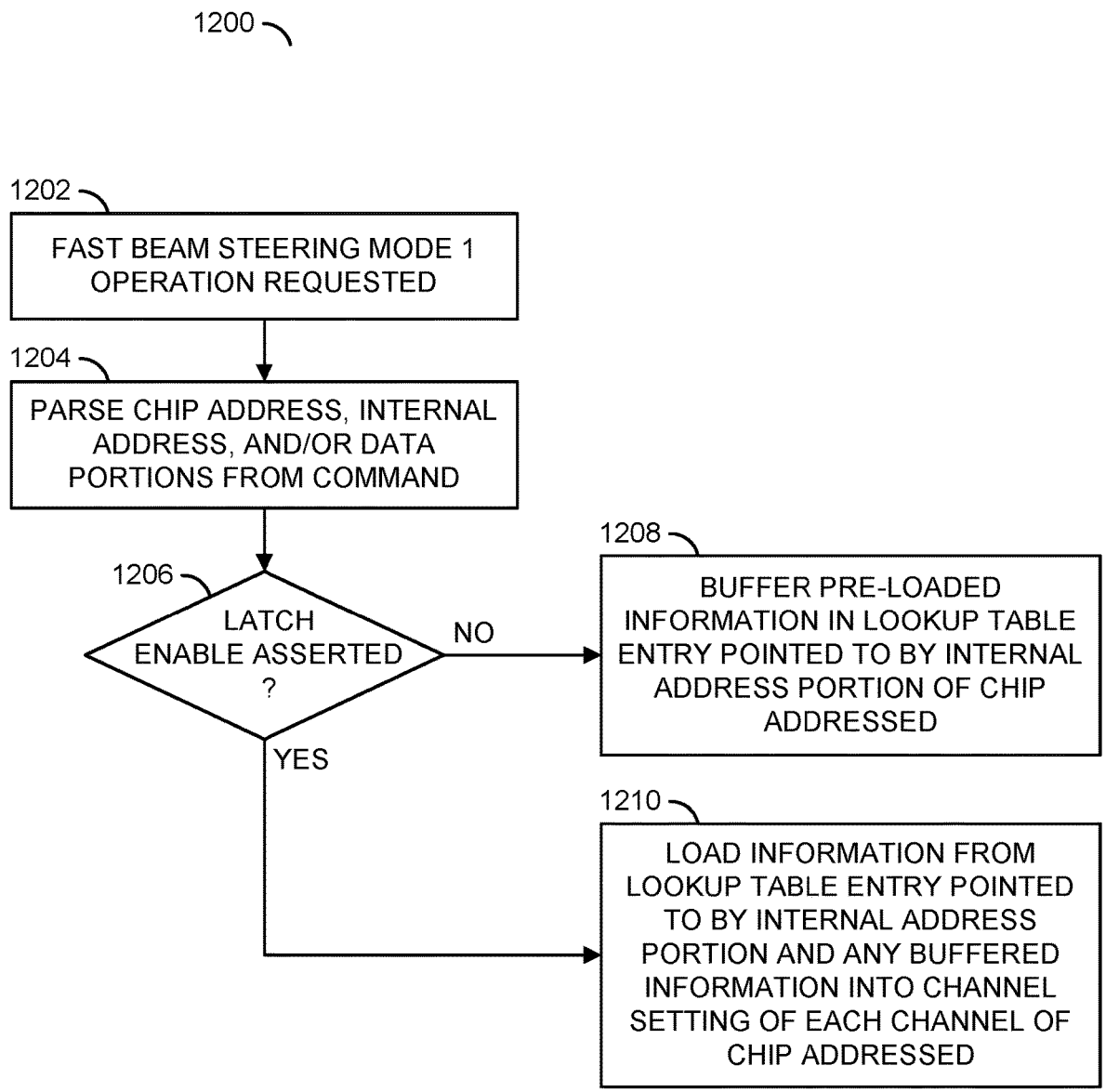
FIG. 19 is a flow diagram illustrating a fast beam steering mode 1 operation in accordance with an example embodiment of the invention.

Referring to FIG. 19, a flow diagram is shown illustrating a fast beam steering mode 1 operation 1200 in accordance with an example embodiment of the invention. The process (or method) 1200 generally comprises a step (or state) 1202, a step (or state) 1204, a decision step (or state) 1206, a step (or state) 1208, and a step (or state) 1210. In the step 1202, the interface circuit 302 may receive a request for a fast beam steering mode 1 operation to be performed. Next, the method 1200 may move to the step 1204. In the step 1204, the circuit 302 may parse the chip address portion 704, the internal address portion 706, and/or the data portion 708 from the operation 700. The method 1200 may then move to the decision step 1206, where the circuit 302 or the circuit 600 determine whether a latch enable signal (or flag) in the operation 700 is asserted. In an example, a bit in the internal address portion 706 may be used to implement the latch enable signal (or flag). In some embodiments, the internal address portion 706 may also be configured (e.g., using one or more bits) to specify whether the target of the fast beam steering mode 1 operation is a lookup table entry for a particular channel (e.g., horizontal channel, vertical channel, receive path channel, transmit path channel, etc.) in the lookup table.

When the latch enable signal is not asserted, the method 1200 may move to the step 1208. In the step 1208, the circuit 302 or the circuit 600 in the chip with the address specified in the chip address portion 704 may buffer pre-loaded information contained in the lookup table entry pointed to by the internal address portion 706. In the decision step 1206, if the latch enable signal is asserted, the method 1200 may move to the step 1210. In the step 1210, the circuit 302 or the circuit 600 in the chip with the address specified in the chip address portion 704 may load the information contained in the target lookup table entry pointed to by the internal address portion 706 along with any buffered information into channel settings of each channel of the chip addressed.

Figure 20:
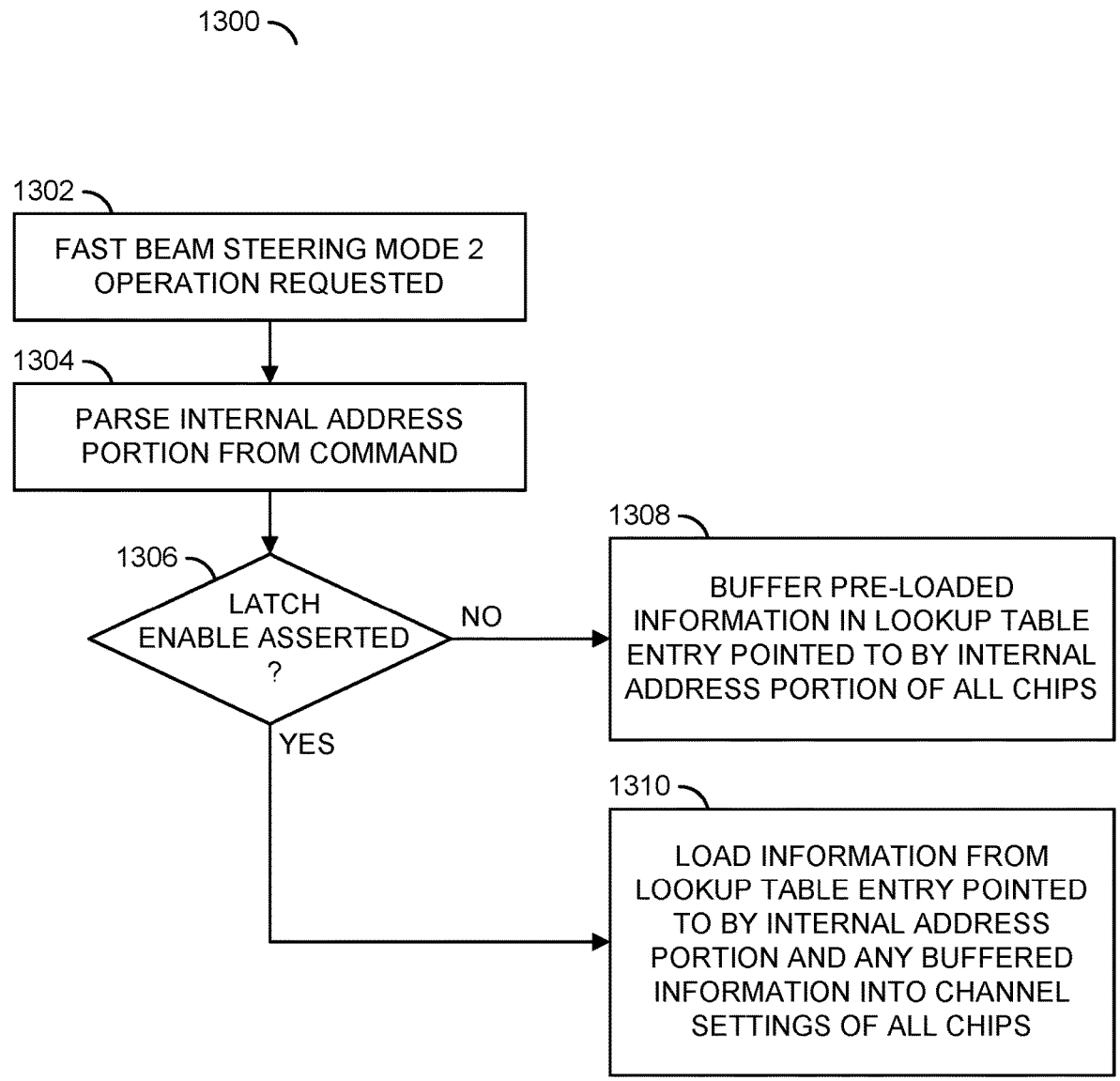
FIG. 20 is a flow diagram illustrating a fast beam steering mode 2 operation in accordance with an example embodiment of the invention.

Referring to FIG. 20, a flow diagram is shown illustrating a fast beam steering mode 2 operation 1300 in accordance with an example embodiment of the invention. The process (or method) 1300 generally comprises a step (or state) 1302, a step (or state) 1304, a decision step (or state) 1306, a step (or state) 1308, and a step (or state) 1310. In the step 1302, the interface circuit 302 may receive a request for a fast beam steering mode 2 operation to be performed. Next, the method 1300 may move to the step 1304. In the step 1304, the circuit 302 may parse the internal address portion 706 from the operation 700. The method 1300 may then move to the decision step 1306, where the circuit 302 or the circuit 600 determine whether the latch enable signal (or flag) in the operation 700 is asserted. In an example, a bit in the internal address portion 706 may be used to implement the latch enable signal (or flag). In some embodiments, the internal address portion 706 may also be configured (e.g., using one or more bits) to specify whether the target of the fast beam steering mode 2 operation is a lookup table entry for a particular channel (e.g., horizontal channel, vertical channel, receive path channel, transmit path channel, etc.) in the lookup table.

When the latch enable signal is not asserted, the method 1300 may move to the step 1308. In the step 1308, the circuit 302 or the circuit 600 in all the chips receiving the request may buffer pre-loaded information contained in the lookup table entry pointed to by the internal address portion 706. In the decision step 1306, if the latch enable signal is asserted, the method 1300 may move to the step 1310. In the step 1310, the circuit 302 or the circuit 600 in all the chips receiving the request may load the information contained in the target lookup table entry pointed to by the internal address portion 706 along with any buffered information into channel settings of each channel of the chips.

Figure 21:
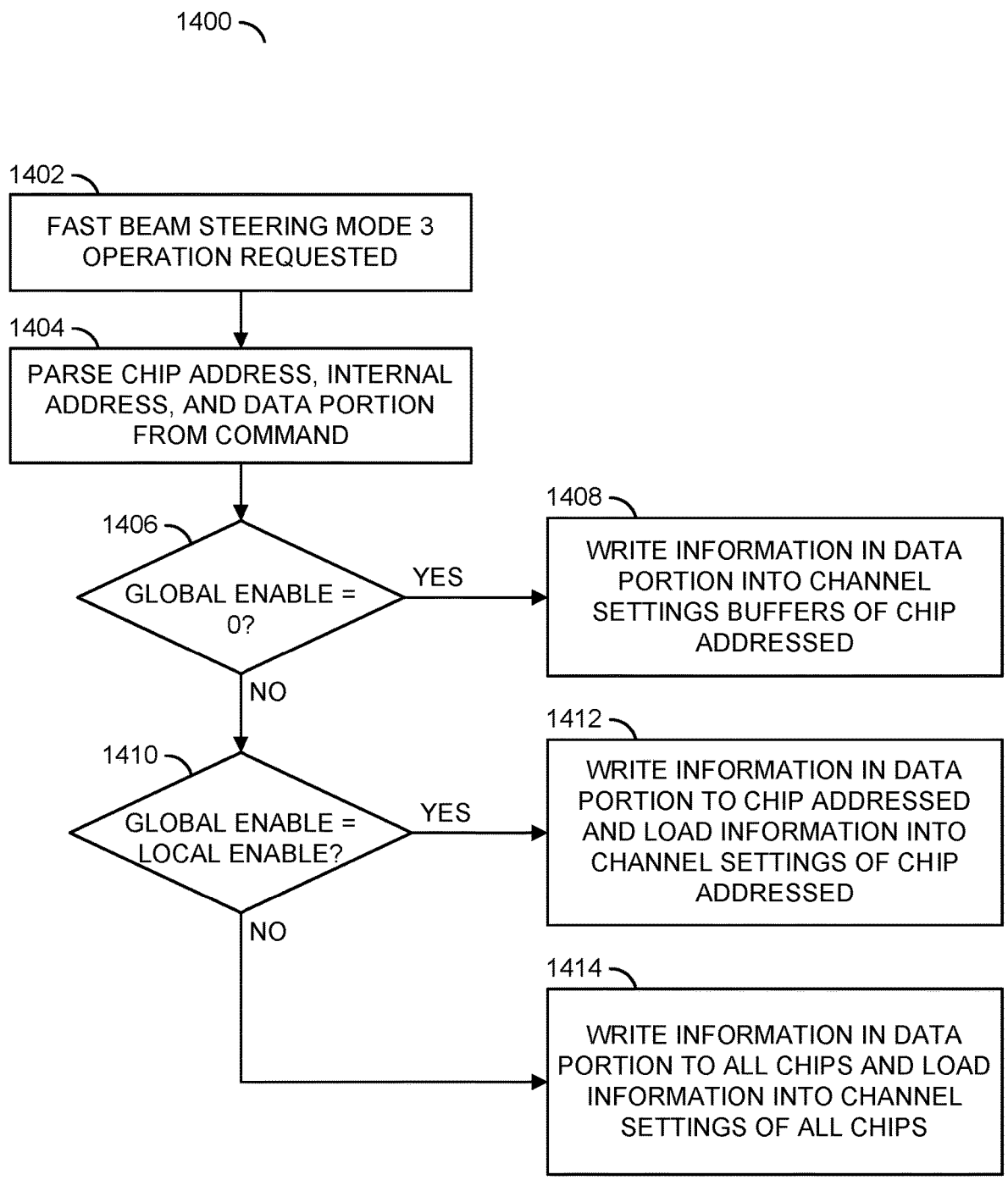
FIG. 21 is a flow diagram illustrating a fast beam steering mode 3 operation in accordance with an example embodiment of the invention.

Referring to FIG. 21, a flow diagram is shown illustrating a fast beam steering mode 3 operation 1400 in accordance with an example embodiment of the invention. The process (or method) 1400 generally comprises a step (or state) 1402, a step (or state) 1404, a decision step (or state) 1406, a step (or state) 1408, a decision step (or state) 1410, a step (or state) 1412, and a step (or state) 1414. In the step 1402, the interface circuit 302 may receive a request for a fast beam steering mode 3 operation to be performed. Next, the method 1400 may move to the step 1404. In the step 1404, the circuit 302 may parse the chip address portion 704, the internal address portion 706, and the data portion 708 from the operation 700. The method 1400 may then move to the decision step 1406, where the circuit 302 or the circuit 600 determine a value of a global enable signal (or flag) in the operation 700. In an example, a number of bits in the internal address portion 706 may be used to implement the global enable signal (or flag). In some embodiments, the internal address portion 706 may also be configured (e.g., using one or more bits) to specify whether the target of the fast beam steering mode 3 operation is a lookup table entry for a particular channel (e.g., horizontal channel, vertical channel, receive path channel, transmit path channel, etc.) in the lookup table.

When the value of the global enable signal is 0, the method 1400 may move to the step 1408. In the step 1408, the circuit 302 or the circuit 600 in the chip having the address specified in the chip address portion 704 may write the information contained in the data portion 708 into channel settings buffers of the addressed chip. In the decision step 1406, if the value of the global enable signal is not 0, the method 1400 may move to the decision step 1410. In the step 1410, the circuit 302 or the circuit 600 determine whether the value of a global enable signal (or flag) is a value corresponding to a local enable mode.

When the value of the global enable signal specifies the local enable mode, the method 1400 may move to the step 1412. In the step 1412, the circuit 302 or the circuit 600 in the chip having the address specified in the chip address portion 704 may write the information contained in the data portion 708 into channel settings buffers of the addressed chip and load the information into the channel settings of the chip addressed. In the decision step 1410, if the value of the global enable signal does not specify the local enable mode, the method 1400 may move to the decision step 1414. In the step 1414, the circuit 302 or the circuit 600 in all the chips receiving the request may write the information contained in the data portion 708 into channel settings buffers of the chips and load the information into the channel settings in all of the chips.

Although embodiments of the invention have been described in the context of a RF application, the present invention is not limited to RF applications, but may also be applied in other high data rate wireless and wired communications applications where different rapid switching, multiple channel, and multiple user issues may exist. The present invention addresses concerns related to high speed wireless communications, mobile and stationary transceivers and point-to-point links. Future generations of wireless communications applications using radio frequency (RF), microwave, and millimeter-wave links can be expected to provide increasing speed, increasing flexibility, and increasing numbers of interconnections and layers. The present invention may also be applicable to wireless communications systems implemented in compliance with either existing (legacy, 2G, 3G, 4G, 5G) specifications or future specifications.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a plurality of transceiver circuits;
a memory embodying a table associating a plurality of index values with corresponding gain and phase values for each of said transceiver circuits; and
an interface circuit, wherein
in a first mode, said interface circuit is configured to receive said corresponding gain and phase values associated with each of said plurality of index values and store said corresponding gain and phase values in said table, and
in a second mode, said interface circuit, in response to receiving one of said index values, configures each of said transceiver circuits with the corresponding gain and phase values from said table.

2. The apparatus according to claim 1, wherein in a third mode, said interface circuit is configured to (i) receive said corresponding gain and phase values associated with a desired beam to be formed and (ii) store said corresponding gain and phase values in said transceiver circuits for application in response to a global enable signal.

3. The apparatus according to claim 1, wherein said plurality of transceiver circuits, said memory, and said interface circuit are part of a beamformer circuit.

4. The apparatus according to claim 1, wherein said apparatus comprises a plurality of beamformer circuits and each beamformer circuit comprises an instance of said interface circuit, a portion of said plurality of transceiver circuits, and a portion of said memory embodying a portion of said corresponding gain and phase values for said portion of said plurality of transceiver circuits.

5. The apparatus according to claim 1, wherein said apparatus is part of a phased array antenna panel.

6. The apparatus according to claim 5, wherein said phased array antenna panel is part of a fifth generation (5G) communications system.

7. The apparatus according to claim 5, wherein said phased array antenna panel is part of a satellite communications system.

8. The apparatus according to claim 1, wherein said interface circuit comprises a serial interface.

9. The apparatus according to claim 1, wherein said interface circuit implements one or more serial communication protocols.

10. The apparatus according to claim 9, wherein said serial communication protocols comprise one or more of a serial peripheral interface protocol, an inter-integrated circuit communications protocol, or a daisy chain.

11. A method of steering a radio frequency beam comprising:
receiving a serial data stream using an interface circuit;
parsing said serial data stream to determine a mode value within said serial data stream;
in response to said mode value indicating a first mode, using said interface circuit to receive a plurality of index values with corresponding gain and phase values for each of a plurality of transceiver circuits and store said corresponding gain and phase values in a lookup table associating said plurality of index values with said corresponding gain and phase values for each of said transceiver circuits; and
in response to said mode value indicating a second mode, using said interface circuit to receive one of said index values and configure each of said transceiver circuits with the corresponding gain and phase values from said lookup table.

12. The method according to claim 11, wherein said interface circuit and said transceiver circuits are part of a beamformer circuit mounted on a phased array antenna panel.

13. The method according to claim 12, wherein in said second mode, said method further comprises:
determining whether a latch enable signal is asserted;
when said latch enable signal is not asserted, buffering pre-loaded information contained in a lookup table entry pointed to by one of said index values; and
when the latch enable signal is asserted, loading the information contained in the lookup table entry pointed to by one of said index values along with any previously buffered information into channel settings of each channel of a beamformer chip having a hard-wired address specified in said serial data stream.

14. The method according to claim 12, wherein in said second mode, said method further comprises:
determining whether a latch enable signal is asserted;
when said latch enable signal is not asserted, buffering pre-loaded information contained in a lookup table entry pointed to by one of said index values; and
when the latch enable signal is asserted, loading the information contained in the lookup table entry pointed to by one of said index values along with any previously buffered information into channel settings of each channel of all beamformer chips mounted on said phased array antenna panel.

15. The method according to claim 12, further comprising:
in response to said mode value indicating a third mode, using said interface circuit to receive one of said index values and configure each of said transceiver circuits with corresponding gain and phase values from said serial data stream.

16. The method according to claim 15, further comprising:
in response to an enable signal having a first value, writing said corresponding gain and phase values from said serial data stream in to buffers of a beamformer chip having a hard-wired address specified in said serial data stream.

17. The method according to claim 16, further comprising:
in response to an enable signal having a second value, writing said corresponding gain and phase values from said serial data stream to said beamformer chip having said hard-wired address specified in said serial data stream and loading said corresponding gain and phase values into channels settings of said beamformer chip having said hard-wired address specified in said serial data stream.

18. The method according to claim 17, further comprising:
in response to an enable signal having a third value, writing said corresponding gain and phase values from said serial data stream to a plurality of beamformer chips receiving said serial data stream and loading said corresponding gain and phase values into channels settings of all of said plurality of beamformer chips receiving said serial data stream.

19. The method according to claim 12, wherein in said second mode, a plurality of beamformer circuits mounted on said phased array antenna panel are programmed to the same beam state in response to said serial data stream.

20. The method according to claim 12, wherein in said second mode, a plurality of beamformer circuits mounted on said phased array antenna panel are programmed to different beam states in response to said serial data stream.

* * * * *